US012186883B2

(12) United States Patent
Cobián-Méndez

(10) Patent No.: US 12,186,883 B2
(45) Date of Patent: Jan. 7, 2025

(54) ERGONOMIC MULTIFUNCTIONAL TOOL HOLDER

(71) Applicant: Antonio Ramón Cobián-Méndez, Guaynabo, PR (US)

(72) Inventor: Antonio Ramón Cobián-Méndez, Guaynabo, PR (US)

( * ) Notice: Subject to any disclaimer, the term of this patent is extended or adjusted under 35 U.S.C. 154(b) by 376 days.

(21) Appl. No.: 17/555,386

(22) Filed: Dec. 18, 2021

(65) Prior Publication Data

US 2023/0191585 A1 Jun. 22, 2023

(51) Int. Cl.

| | |
|---|---|
| ***B25G 1/06*** | (2006.01) |
| ***A46B 17/02*** | (2006.01) |
| ***A47L 13/38*** | (2006.01) |
| ***A47L 13/50*** | (2006.01) |
| ***B25G 3/00*** | (2006.01) |
| *B25G 1/04* | (2006.01) |
| *B44D 3/12* | (2006.01) |
| *B44D 3/16* | (2006.01) |

(52) U.S. Cl.

CPC ................ *B25G 1/06* (2013.01); *A46B 17/02* (2013.01); *A47L 13/38* (2013.01); *A47L 13/50* (2013.01); *B25G 3/00* (2013.01); *A46B 2200/202* (2013.01); *A46B 2200/3026* (2013.01); *B25G 1/04* (2013.01); *B44D 3/123* (2013.01); *B44D 3/162* (2013.01)

(58) Field of Classification Search

CPC .... B25G 1/06; B25G 1/04; B25G 3/00; A46B 17/02; B44D 3/123

See application file for complete search history.

(56) References Cited

U.S. PATENT DOCUMENTS

| | | | | |
|---|---|---|---|---|
| 1,268,734 A * | 6/1918 | Lay | ...................... | A46B 5/0083 81/177.8 |
| 2,346,570 A | 4/1944 | Francis | | |
| 2,395,245 A | 2/1946 | Boeharim | | |
| 2,469,050 A | 5/1949 | Mygas | | |
| 2,792,581 A | 5/1957 | Woyton | | |
| 3,357,035 A | 12/1967 | Ficke | | |
| 3,413,043 A | 11/1968 | Bertolina | | |
| 3,994,037 A | 11/1976 | Sims | | |
| 4,127,296 A | 11/1978 | Thomson | | |
| 4,525,889 A | 7/1985 | Dunau | | |
| 4,528,714 A | 7/1985 | Beck | | |

(Continued)

*Primary Examiner* — Hadi Shakeri

(74) *Attorney, Agent, or Firm* — Reyes Law Services; Hector M. Reyes Rivera

(57) ABSTRACT

The invention is directed to an ergonomic tool holder, adaptable to a conventional pole and having a handle and a supporting base. These are coupled to an interconnecting unit in a non-permanent manner. The coupling of the handle to the interconnecting unit and the coupling of the supporting base to the interconnecting unit allows the tool holder to be assembled, having the handle in straight or multiple angled positions with regard to the supporting base and wherein the tool may be held and positioned along the X-X, Y-Y, or Z-Z axes. A given conventional utensil used in working activities such as painting or maintenance may be clamped and secured on the supporting base. Thus, the User may position such utensils in the tool holder straight or in the angled position at their convenience and may change such positions easily and quickly.

16 Claims, 15 Drawing Sheets

(56) References Cited

U.S. PATENT DOCUMENTS

| | | | | | |
|---|---|---|---|---|---|
| 4,729,587 | A * | 3/1988 | Ward | B44D 3/123 248/113 |
| 4,805,494 | A * | 2/1989 | Santoro | B25D 1/00 81/177.8 |
| 4,854,625 | A | 8/1989 | Eubamks et al. | |
| 5,056,952 | A | 10/1991 | Gringer | |
| 5,207,755 | A | 5/1993 | Ampian | |
| 5,329,663 | A | 7/1994 | Council | |
| 6,845,692 | B2 * | 1/2005 | Cooper | B25G 1/043 81/177.85 |
| 7,013,774 | B1 | 3/2006 | Allart et al. | |
| 8,132,978 | B2 | 3/2012 | Franklin et al. | |
| 8,566,999 | B1 | 10/2013 | Casey | |
| 8,595,883 | B1 | 12/2013 | Kern | |
| 8,839,480 | B2 | 9/2014 | Thomas | |
| 9,289,895 | B1 * | 3/2016 | Bauer | B25G 1/04 |
| 9,486,060 | B1 | 11/2016 | Cara | |
| 10,675,651 | B2 | 6/2020 | Gaige | |
| 11,395,456 | B1 * | 7/2022 | Ramsey | A01D 7/06 |
| 2004/0035013 | A1 * | 2/2004 | Cummings | G01B 5/0025 7/164 |

* cited by examiner

ERGONOMIC MULTIFUNCTIONAL TOOL HOLDER

TECHNICAL FIELD

The invention relates to an ergonomic multifunctional tool holder suitable to be adapted to a conventional extension pole. It is particularly directed to an ergonomic tool holder wherein a tool may be held and positioned in multiple angled positions along the X-X axis, the Y-Y axis, and the Z-Z-axis.

BACKGROUND OF THE INVENTION

The difficulties of working on areas and objects out of the worker's reach are well known in the art. A second main problem, well known in the art, is that the surface or object in a difficult place to reach may be placed or oriented in various angular positions, which are also difficult to paint or clean. The use of ladders, cradles, scaffolds, and the like have been used as alternatives in reaching and working on such areas and objects. However, such options are considered time-consuming and inefficient since the workers must consistently move and reposition the working or painting materials to reach areas or objects out of reach. Furthermore, said alternatives usually result in highly insecure and potentially dangerous work conditions.

A painter can be injured due to a fall from a height or even as a result of awkwardly stretching his body while trying to reach ceilings and walls. This stress and strain on the body can lead to long-term back and muscle injuries. Thus, even with the assistance of conventional extension poles, the fact that the tools used in such working activities are not possible to be positioned in the most convenient angled position suitable to the angled position of the high area or high located object generally forces the worker to assume a stressful posture.

It is well known in the art that such non-ergonomic, awkward postures-mainly when using the arm above shoulder level while doing a repetitive movement-generates musculoskeletal disorders caused by injuries in the joints, bones, and nerves that negatively affect the wrists, arms, shoulders, upper and lower back, and neck of workers. Among the most common of such disorders are Tendinitis, Carpal Tunnel Syndrome, Thoracic Outlet syndrome, back and neck pain, among others.

Regarding the insecure and dangerous work embodiments while painting or performing maintenance activities in high to reach places or high installed objects, some holders have been designed and presented as potential solutions to such problems; for instance, the holders disclosed in U.S. Pat. Nos. 2,469,050; 2,792,581; 3,413,0343; 3,357,035; 3,994, 037; 4,127,296; 4,525,889; 4,854,625; 5,056,952; 8,566, 999; and 8,839,480. In such patents, the disclosed holders are generally designed mostly for paint brushes or paint rollers. In most of them, the tool held may be assembled in different predetermined or specific angles within the same plane. Therefore, the predetermined angles in which the tool may be positioned using such holders may not necessarily match the multiple angles of the high areas or the objects installed in high locations wherein the worker has to perform painting or cleaning activities.

On the other hand, and with regards to addressing the angled positioning of the tool, general approaches have been designed and presented in specific and nonconventional painting and maintenance tools, as those shown in U.S. Pat. Nos. 2,395,245; 4,528,714; 5,207,755; 8,132,978, and 9,486,060. In such patents, the disclosed tools are designed with nonconventional, particular, and exclusive structures that allow the functional part of the tool-usually, the brush paint or the paint roller-to be positioned in different angles of a single plane or on other particular planes and are designed only to that specific, exclusive, and nonconventional tool.

Therefore, there is a need to provide an ergonomic multifunctional tool holder that may be adapted to a conventional extended pole, and that also may be assembled to a conventional tool used in painting activities and in maintenance activities that allows setting the position of the tool in multiple angled positions along the different X-X axis, the Y-Y axis, and the Z-Z axis at the convenience of the worker.

SUMMARY OF THE INVENTION

The herein-disclosed invention provides a tool holder for firmly and steadily holding conventional tools in multiple angled positions that may be adapted to a conventional extension pole. The herein-disclosed tool holder may be used in painting preparation for surfaces and painting areas that are difficult to reach since it may firmly hold painting utensils such as paint brushes, painting scrapers, painting rollers, and other tools used in painting activities.

It may also hold tools used in maintaining and cleaning objects and surfaces located or installed in places out of the reach of the workers or with difficult access. The disclosed tool holder allows workers to paint and clean said areas and objects more safely since it eliminates the need for ladders, cradles, scaffolds, or the like.

The disclosed tool holder comprises a handle having an elongated, integral, cylindrical body with a proximal end and a distal end. The proximal end has a threaded borehole suitable to be adapted to a conventional extension pole. The distal end is rounded and has no exit to the exterior of the handle. From the center of said distal rounded end emerges a protrusion comprising a flat external surface and a flat internal. The external end of said protrusion is rounded. From the flat internal surface of said protrusion emerges a cylindrical protuberance comprising multiple wedges arranged radially and alternately with wedge-shaped recesses on top. At the center of said cylindrical protrusion, there is an aperture traversing the flat internal surface and the flat exterior surface of said protrusion. The entire elongated integral cylindrical body of the handle has a symmetrical axis.

The tool holder herein disclosed also includes an interconnection section having a main body having an entire or complete physical configuration provided by a first oval section having a flat external surface and a flat internal surface and a second oval section having a flat external surface and a flat internal surface, wherein said second oval section is perpendicular to the first oval section. A first cylindrical protuberance emerges from the flat internal surface of the first oval section. The first cylindrical protuberance comprises multiple wedges arranged radially and alternately, with wedge-shaped recesses on top. At the center of said cylindrical protuberance, there is an aperture traversing the flat internal surface and the flat exterior surface of the first oval section. The first cylindrical section on the flat internal section of the first oval section is coupled and secured selectively and in a predetermined position to the cylindrical protuberance on the flat internal surface of the protrusion of the handle, said coupling providing the coupling of the handle to the interconnecting unit.

Similarly, a second protuberance emerges from the flat internal section of the second oval section. Just as in the first cylindrical protuberance, the second cylindrical protuberance comprises multiple wedges arranged radially and alternately with wedge-shaped recesses on top. At the center of said second cylindrical protuberance is an aperture traversing the flat internal surface and the exterior surface of the second oval section. Since the first oval section is perpendicular to the second oval section, the first cylindrical protuberance is perpendicular to the second cylindrical protuberance. What is the same as saying that the symmetry axis of the first oval section is perpendicular to the symmetry axis of the second oval section.

The tool holder of this invention also requires a supporting base having a flat main body comprising a flat internal surface, a flat external surface, a proximal end, and a distal end. Said main body has multiple holes traversing the internal flat surface and the flat external surface of said flat main body. It also comprises a cylindrical protuberance emerging from the flat internal surface of the flat main body. Said cylindrical protuberance comprises multiple wedges arranged radially and alternately with wedge-shaped recesses on top of said cylindrical protuberance. An aperture at the center of said cylindrical protuberance traverses the flat internal surface and the flat exterior surface of the flat main body of the supporting base. The cylindrical protuberance on the internal surface of the supporting base is coupled and secured selectively and a predetermined position to the second cylindrical protuberance on the flat internal surface of the second oval section of the interconnecting unit; said coupling, therefore, engaging the interconnecting unit to the supporting base. Due to the perpendicular position of the first oval section with respect to the second oval section, the coupling of the handle with the first oval section is perpendicular to the coupling of the supporting base with the second oval section of the interconnecting unit.

Thus, the symmetry axis of the handle is suitable to be positioned parallel to the symmetry axis of the first oval section without affecting the relative position of the supporting base. Alternatively, the handle is suitable to be assembled to the first oval section in multiple positions wherein the symmetry axis of the handle is in a nonparallel position to the symmetry axis of the first oval section without affecting the relative position of the supporting base.

On the other hand, the symmetry axis of the supporting base is suitable for positioning parallel to the symmetry axis of the second oval section without affecting the relative position of the handle. Alternatively, the supporting base is suitable for assembly to the second oval section in multiple positions wherein the symmetry axis of the supporting base is in a nonparallel position to the symmetry axis of the second oval section without affecting the relative position of the handle.

Thus, the herein disclosed tool holder allows the worker to conveniently select the most convenient, suitable, and ergonomic position of the handle and the supporting base with respect to the position of the tool being held on the supporting base in order to perform a given activity according to the position or location of the object or area that the worked have to work on.

BRIEF DESCRIPTION OF THE DRAWINGS

The preceding and additional features and characteristics of the embodiments of the present invention will become more apparent from the following detailed description considered with reference to the accompanying drawings, which are used herein in a manner of example only, and wherein.

DETAILED DESCRIPTION OF THE INVENTION

Figure 1:
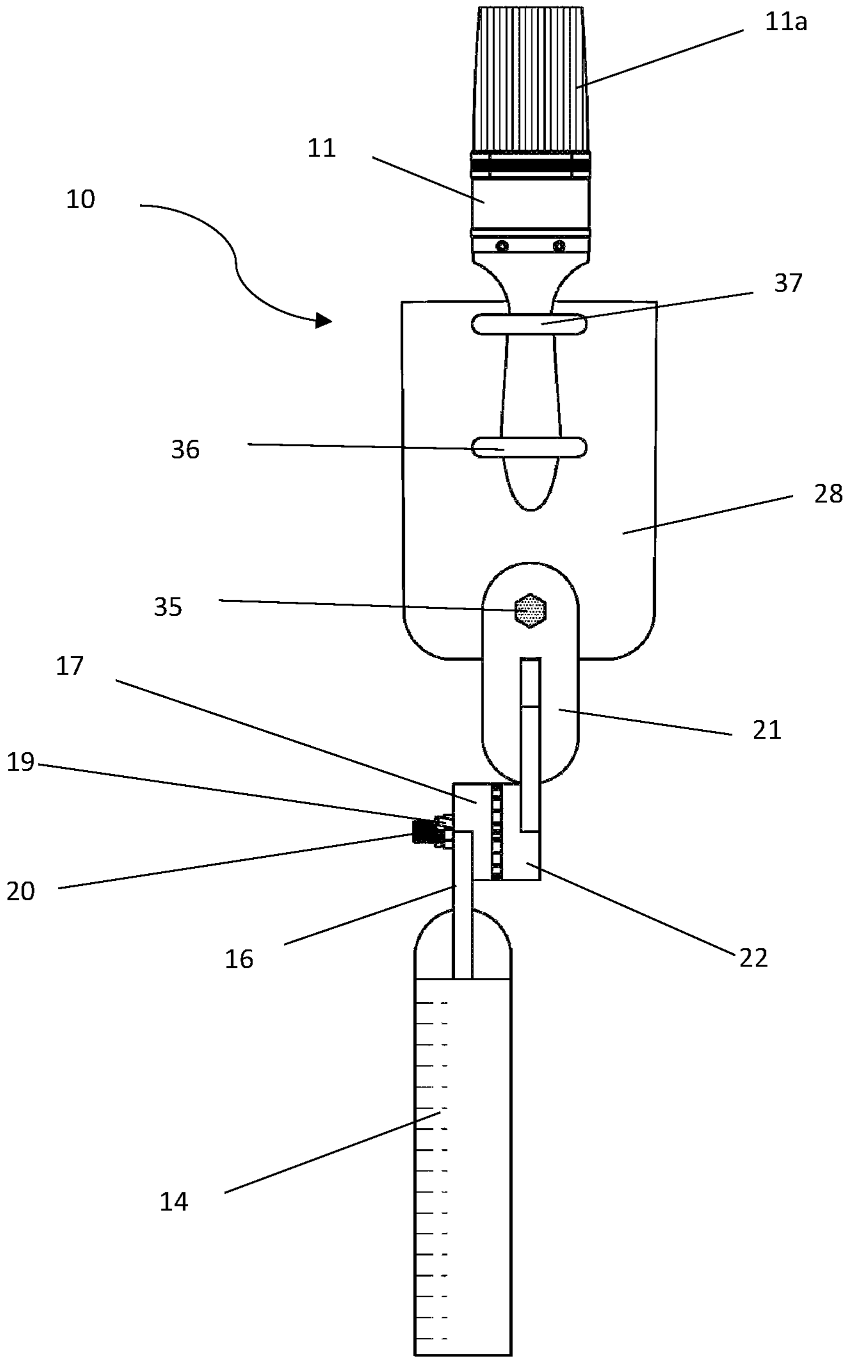
FIG. 1 illustrates a top view of an embodiment of the tool holder according to the invention, holding a conventional painting brush, as an example of a conventional utensil that may be clamped, fastened, or secured on the supporting base of the tool holder, and wherein the symmetry axis of the handle is parallel to the symmetry axis of the first oval section and the symmetry axis of the supporting base is parallel to the symmetry axis of the second oval section.

The present invention and its detailed embodiments are disclosed herein. However, this invention may be embodied in many different forms and should not be construed as limited to the embodiments set forth herein. Instead, these embodiments are provided so that this disclosure will be thorough and complete and fully convey the invention's scope to those skilled in the art. It is to be understood that the disclosed embodiments are merely exemplary of the invention that may be embodied in various and alternative forms within the scope of the invention. Therefore, specific structural and functional details disclosed herein are not to be interpreted as limiting but merely as a representative basis for the claims and/or as a representative basis for teaching one skilled in the art how to make and use the present invention. It is thus to be understood that this invention is not limited to particularly exemplified structures, components, methods, or uses, as such may, of course, vary. In the drawings, the size and relative sizes of regions may be exaggerated for clarity. The drawings are not necessarily to scale; some features may be exaggerated or minimized to show details of components or parts. It is also to be understood that the terminology used herein is to describe embodiments of the invention only and is not intended to limit the scope of the invention in any manner. It must be noted that, as used in this specification and the appended claims, the singular forms "a", "an" and "the" include plural referents unless the content clearly dictates otherwise. Similarly, it will be understood that when an element is referred to as being "on", "connected to," or "coupled to" another element or layer, it can be directly on, connected, or coupled to the other element or intervening elements may be present. On the other hand, when an element is referred to as being "directly on," "directly connected to" or "directly coupled to" another element, there are no intervening elements present. Like numbers refer to like elements throughout. As used herein, the term "and/or" includes any combinations of one or more of the associated listed items.

It will be understood that, although the terms "first", "second", "third" and the like, are used as a relative reference to any other part of the invention, in order to adequately explain and identify the particular details of the invention, and that such terms may be used herein to describe various elements, components, regions and/or sections, these elements, components, regions and/or sections should not be limited by these terms. These terms are only used to distinguish one element, component, region, or section from another element, component, region, or section. Thus, a first element, component, region, or section discussed below could be termed a second element, component, region, or section without departing from the teachings of the present invention. Furthermore, spatially relative terms, such as "beneath," "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below", or "beneath" other elements or features would then be oriented "above" the other elements or features. Thus, the exemplary term "below" can encompass both an orientation of above and below. The device may be otherwise oriented or subjected to a rotation in each orientation, and the spatially relative descriptors used herein are interpreted accordingly. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. It should be understood that the size of the holder and its components may increase or decrease relative to the size of the held utility upon which the device is used or intended to be used.

A top view of an embodiment of the tool holder 10 according to the invention is shown in FIG. 1, having a conventional painting brush 11 already assembled. It should be understood that said conventional paint brush 11 is used in different figures of the instant application as an example of multiple other utensils that may be assembled in any embodiment within the scope of the herein disclosed tool holder 10. Said conventional tool is not a section of the tool holder nor requires a specific design shape to be physically connected to the tool holder according to the invention.

Figure 2:
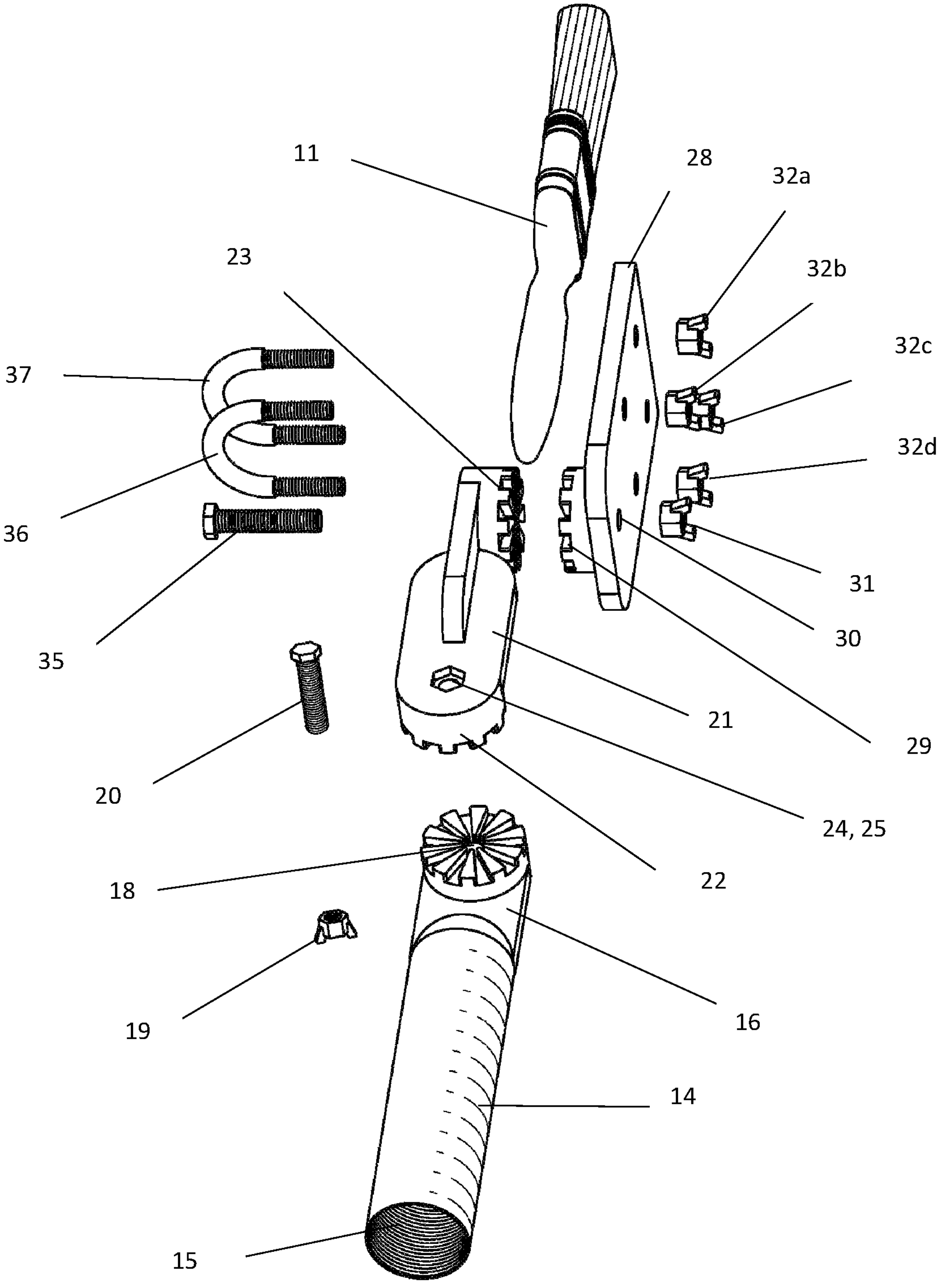
FIG. 2 shows an exploded view of the embodiment of the tool holder according to the invention illustrated in FIG. 1 wherein the holder on FIG. 1 has been turned to position the handle below the interconnection unit.

As illustrated in FIGS. 1 and 2, tool holder 10 comprises handle 14, interconnecting unit 21, and supporting base 28. FIG. 2 shows an exploded view of the embodiment of tool holder 10 illustrated in FIG. 1, after said holder has been rotated 90 degrees clockwise. As illustrated in FIG. 1 and suggested in FIG. 2, handle 14 is coupled to the interconnecting unit 21. Said first coupling point is further fastened by means of inserting screw 20 through aperture 25 and 18 and tightening butterfly wing nut 19 to the end section of straight screw 20. Similarly, supporting base 28 is also coupled to the interconnecting unit 21 and further fastened by inserting straight screw 35 through already aligned apertures 27 and 30 and tightening butterfly wing nut 31 to the end section of screw 35. Said second coupling point is perpendicular to the first coupling point, as shown in the positions of screws 20 and 35 in FIG. 2, wherein screw 20 is inserted from the top to the bottom of the interconnecting unit 21, while screw 35 is inserted from the left to the right of interconnecting unit 21. Once assembled the first and second coupling points, any suitable and conventional utensil, such as those used in painting activities or cleaning activities, may be fastened and secured to the flat surface of the supporting base 28 with any suitable fastening means, such as the U-shaped screws 36 and 37, used in collaboration of butterfly nuts 32*a* to 32*d* in order to fast paint brush 11, as illustrated, for instance, in FIG. 1. Handle 14, interconnecting unit 21, and supporting base 28 may be made of any suitable strong, hard, and resilient material such as, for instance, metal, plastic, polyvinylchlorides (PVC), or combinations thereof, using any suitable methods known in the art, such as, for example, molding machine techniques and the like. The manner in which handle 14 and supporting base 28 are coupled to the interconnecting unit 21, and the consequences of such couplings in the relative positions of handle 14 with respect to supporting base 28 are explained below.

Figure 3:
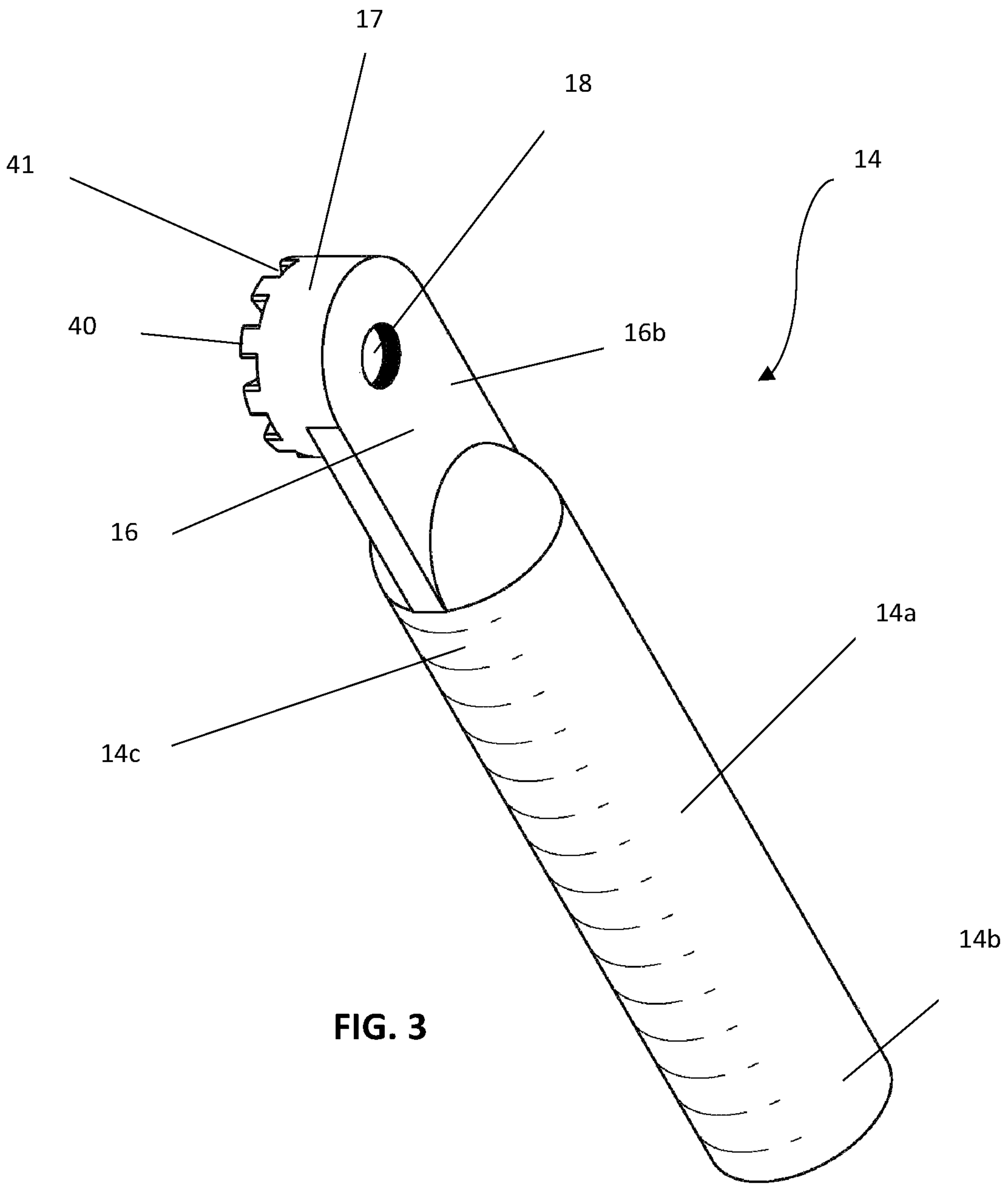
FIG. 3 illustrates a perspective view of the handle of the tool holder embodiment illustrated in FIG. 1, showing the exterior surface of its protrusion.
Figure 4:
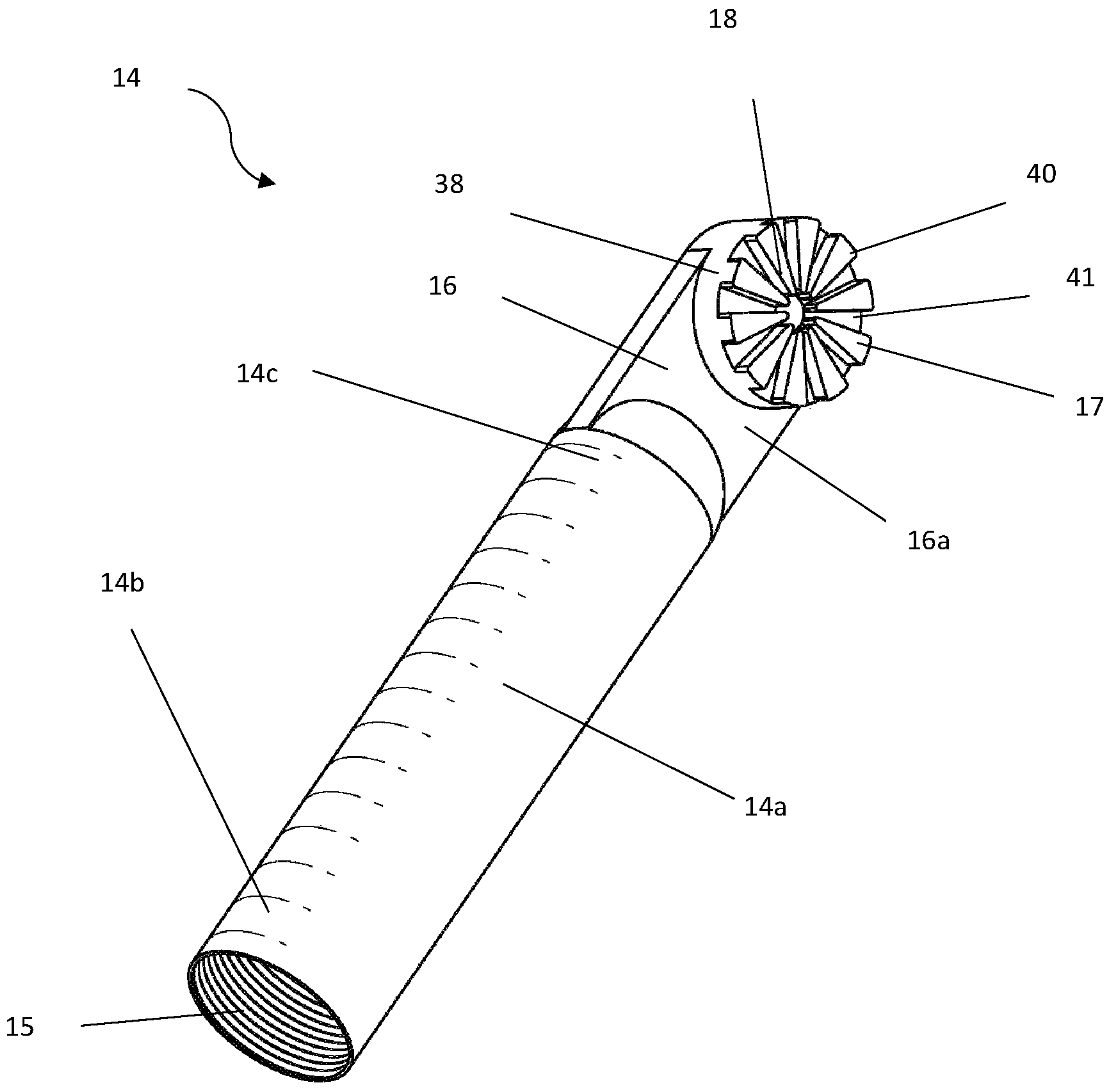
FIG. 4 illustrates a perspective view of the handle of the tool holder embodiment illustrated in FIG. 1, showing the interior surface of its protrusion and its cylindrical protuberance.

More specific details of the handle 14 are illustrated, for instance, in FIGS. 2, 3, and 4; it includes a main elongated body 14*a*, which is preferably cylindrical; a proximal end 14*b*, a rounded distal end 14*c*, a threaded borehole 15 at the proximal end 14*b*, and a protrusion 16 emerging from the center of the rounded distal end 14*c*. The threaded borehole 15 may be adapted to a commercially available extension pole by inserting and threading the threaded section of said extension pole into the threaded borehole 15, thus facilitating the use of the herein disclosed tool holder in high areas or in objects located in high or elevated areas, or other areas which are difficult to reach by workers.

The protrusion 16 has an internal flat surface 16*a*, an external flat and smooth surface 16*b*, and a rounded end. Handle 14 comprises also a single cylindrical protuberance 38, which emerges from the internal section 16*a* of said protrusion 16. Said cylindrical protrusion 38 comprises multiple wedges 17 and 40 arranged radially and in an alternate manner on top of said circular protuberance 38. In other words, there is a wedge-shaped recess 41 between each one of the radially distributed wedges 17, 40 or simply, the multiple wedges are arranged radially and alternately with wedge-shaped recesses on top of the cylindrical protuberance 38. The circular protuberance 38 comprises an aperture 18 that extends through or traverses the internal surface 16*a* to the external surface 16*b*. As shown particularly in FIGS. 3 and 4, elongated body 14*a*, protrusion 16, and cylindrical protuberance 38 are all part of the integral or complete structure of handle 14. As shown and illustrated, the longitudinal axis moving from top to bottom via the center of said integral structure is a symmetrical axis that imaginarily divides the structure into two identical halves.

Figure 5:
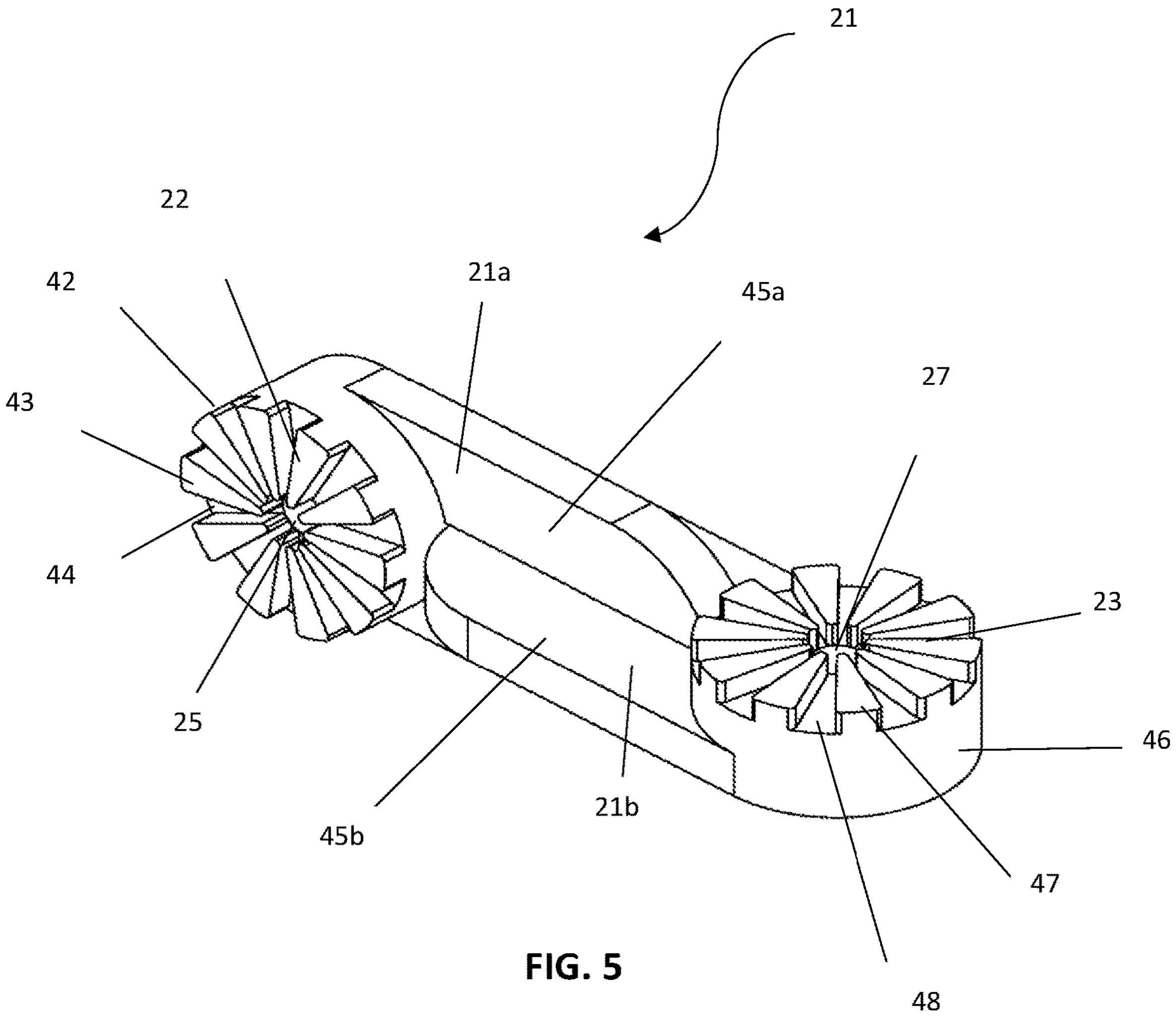
FIG. 5 illustrates a perspective view of the interconnecting unit of the tool holder embodiment illustrated in FIG. 1, showing its interior surfaces and its first and second cylindrical protuberances positioned perpendicularly to one another.
Figure 6:
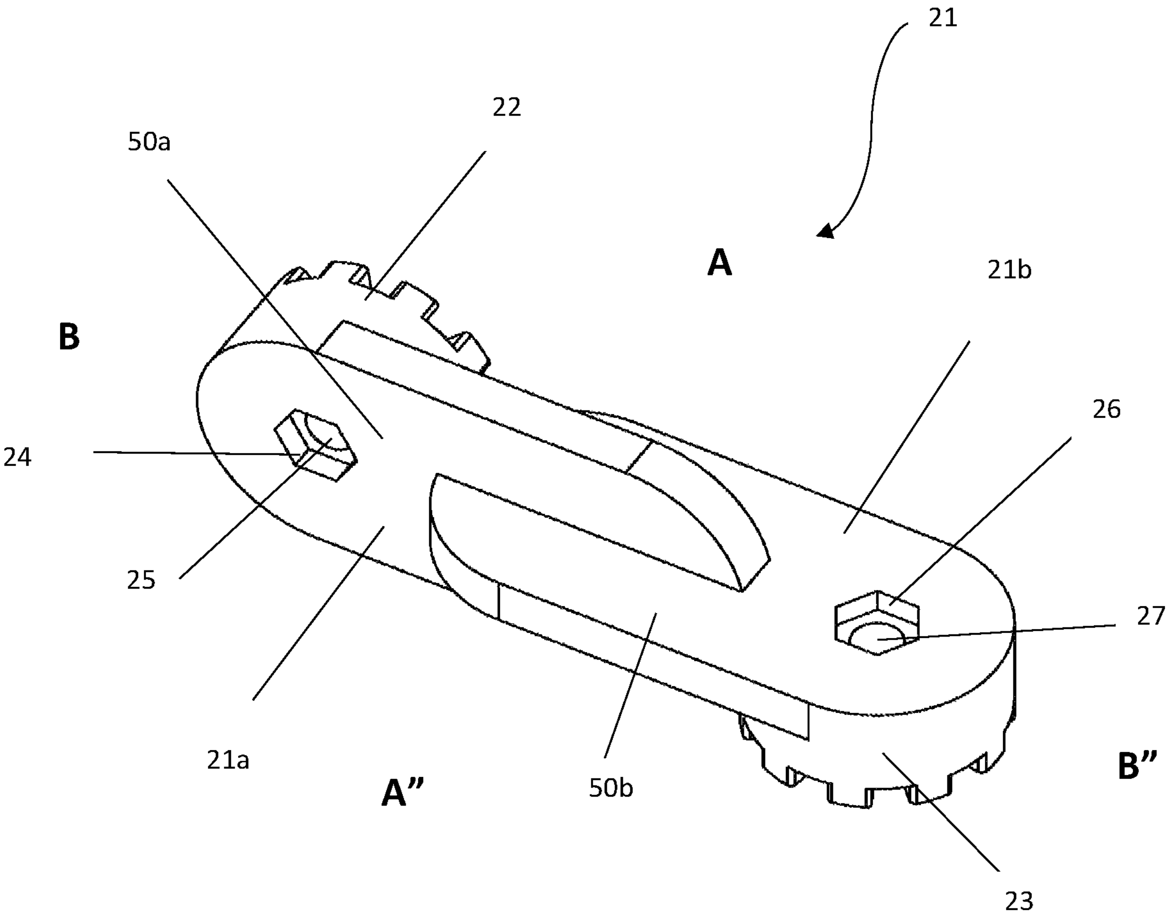
FIG. 6 illustrates a perspective view of the interconnecting unit of the tool holder embodiment illustrated in FIG. 1, showing its exterior surfaces and the corresponding sockets and apertures on each of its oval-shaped sections.
Figure 7:
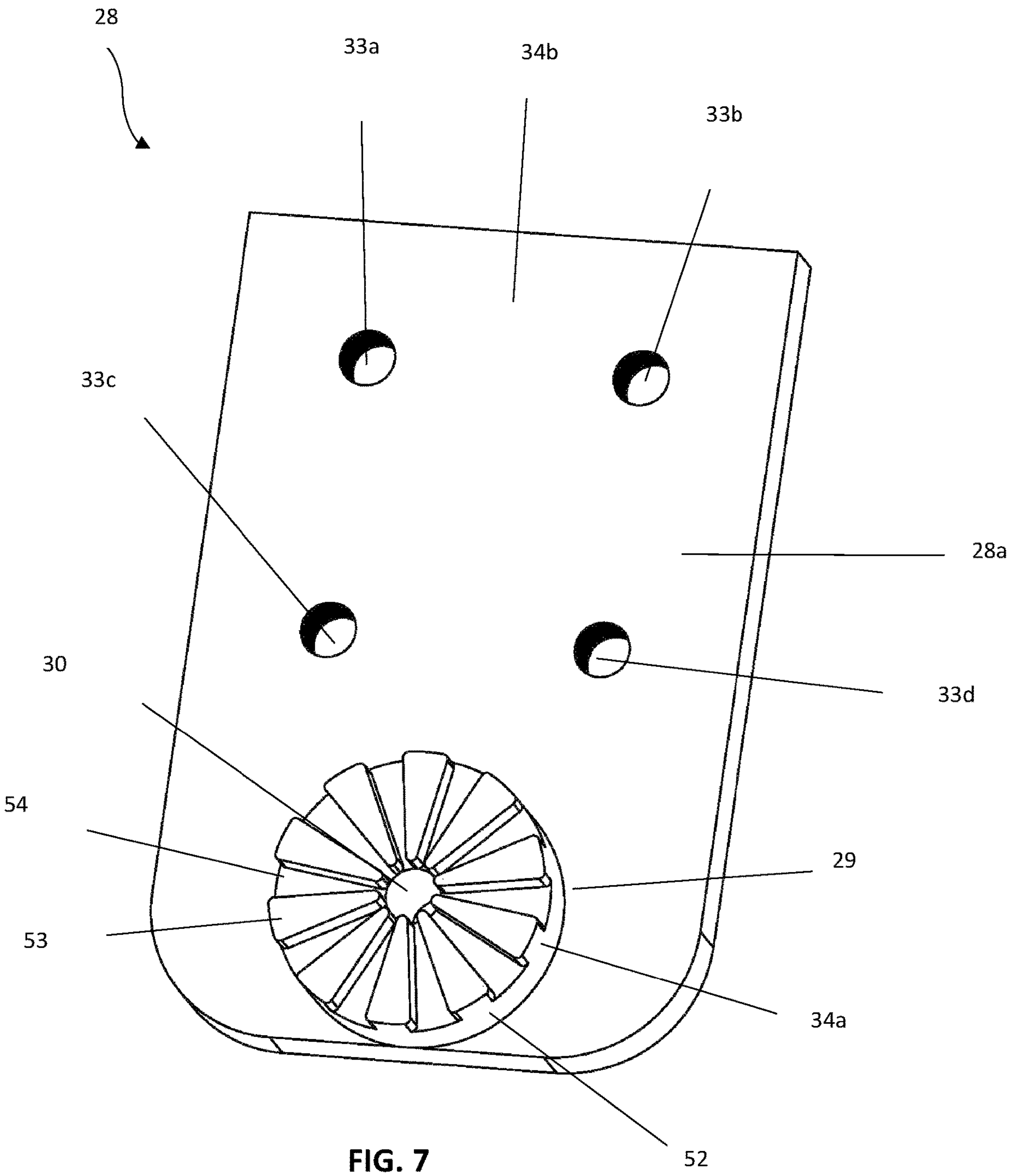
FIG. 7 illustrates a perspective view of the supporting base of the tool holder embodiment illustrated in FIG. 1, showing its interior surface and the cylindrical protuberance on its flat internal surface.
Figure 8:
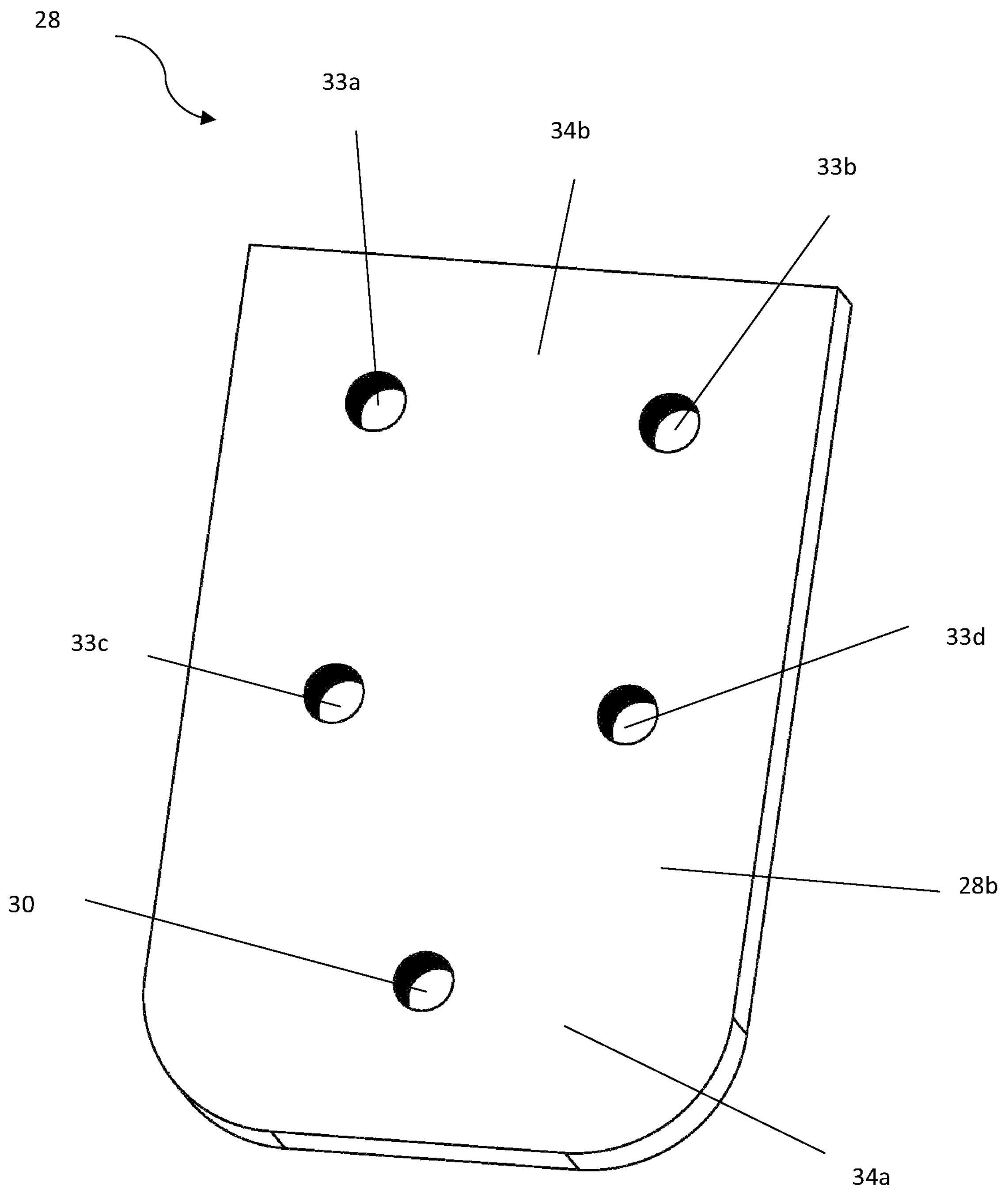
FIG. 8 illustrates a perspective view of the supporting base of the tool holder embodiment illustrated in FIG. 1, showing its exterior surface.
Figure 9:
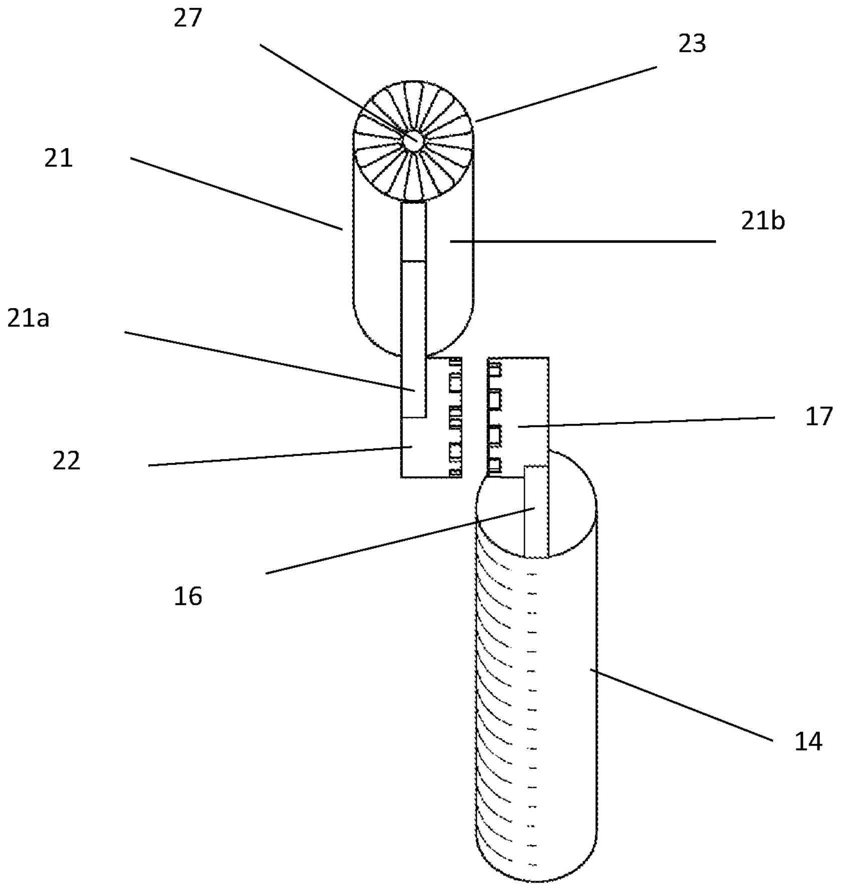
FIG. 9 is a perspective view, showing the initial step of coupling the first cylindrical protuberance on the internal oval section of the interconnecting unit with the cylindrical protuberance on the protrusion of the handle; providing the assemble of the handle and the interconnecting unit of the tool holder according to the invention.

Interconnecting unit 21, illustrated in FIGS. 1 and 2, is shown in FIGS. 5 and 6 in expanded views. It comprises a main body having a first oval section 21*a* comprising an internal surface 45*a* and an external surface 50*a*; and a second oval section 21*b*, which comprises an internal surface 45*b* and an external surface 50*b*. As shown more particularly in FIGS. 5 and 6, the first oval section 21*a* and the second oval section 21*b* are the sections that provided the integral, complete asymmetrical structure of the interconnecting unit 21. However, the first oval section 21*a*, as well as the second oval section 21*b*, have symmetrical shapes. Thus, the first oval section has a symmetry axis, and the second oval section also has a symmetry axis. In fact, as illustrated particularly in FIGS. 5 and 6, the physical configuration of the interconnecting unit 21 is provided by having the first oval section positioned in a perpendicular position with respect to the second oval section. In the physical configuration of the integral structure of interconnecting unit 21, the symmetrical axis of the first oval section is perpendicular to the symmetrical axis of the second oval section.

Interconnecting unit 21 also comprises a first cylindrical protuberance 42, which emerges from the internal surface 45*a* of said first oval section 21*a* of the main body of interconnecting unit 21, and a second cylindrical protuberance 46 which projects from the internal surface 45*b* of the second oval section 21*b*. Said first cylindrical protuberance 42 comprises multiple wedges 43 arranged radially and in an alternate manner on top of said first cylindrical protuberance 42; in other words, there is a series of wedge-shaped indentations or recesses 44, radially and alternately distributed between each one of the radially distributed wedges 43. Aperture 25 is located at the center of the circular protuberance 42, as illustrated particularly in FIGS. 5 and 6. Said aperture 25 extends through or traverses the interior surface 45*a* to the center of the socket 24, located on the external surface 50*a* of the first oval section 21*a* of the interconnecting unit 21.

Similarly, the second cylindrical protuberance 46 also comprises multiple wedges 47 arranged radially and alternately on top of said circular protuberance 46. In other words, there is a wedge-shaped indentation or recess 48 between each one of the radially distributed wedges 47. As illustrated more particularly in FIGS. 5 and 6, the second cylindrical protuberance 46 on the second oval section 21*b* of the interconnecting unit 21 also comprises the aperture 27 at the center of the cylindrical protuberance 46; said aperture 27 extends through the interior surface 45*b* to the center of the socket 26, emerging from the external surface 50*b* of the second oval section 21*b* of interconnecting unit 21.

Since the first oval section 21*a* is perpendicular to the second oval section 21*b*, as pointed out above, the first cylindrical protuberance 42 on the first oval section 21*a* is also perpendicular to the second cylindrical protuberance 46 on the second oval section 21*b*. Consequently, aperture 25 at the center of the first cylindrical section 42 is also perpendicular to aperture 27 at the center of the second cylindrical protuberance 46.

As illustrated, particularly in FIG. 6 the first cylindrical protuberance 42 and the second cylindrical protuberance 46 are identical and have the same physical characteristics. In reference to FIG. 5, once the main integral body of interconnecting unit 21 is rotated 90 degrees clockwise around the imaginary transversal axis A-A" and further rotated 180 degrees counterclockwise along the imaginary longitudinal axis B-B", the interchange of the positions of the first cylindrical protuberance 42 on the first oval section 21*a* with the second cylindrical protuberance 46 on the second oval section 21*b* takes place. In other words, the first cylindrical protuberance 42 is positioned in the area that used to be the second cylindrical protuberance 46 and vice versa. Thus, the herein presented identification as the first cylindrical protuberance and the second cylindrical protuberance of these engagement units are used only to describe the interconnecting unit 21 of the instant invention. In simple words, the designation of the first cylindrical protuberance and the second cylindrical protuberance may be relative or interchangeable based on the positions of each one of them in the main body of interconnecting unit 21.

Regarding supporting base 28, and as illustrated especially in FIGS. 1, 2, 7, and 8, comprises a flat main body having an internal surface 28*a*, an external surface 28*b*, a preferably curved proximal end 34*a*, and a preferably straight distal end 34*b*. An imaginary longitudinal axis, meaning moving from top to bottom and through the center of said flat main body, generates two identical mirror images, thus said longitudinal axis. Therefore, the main flat body of base 28 is a main symmetrical integral structure.

It also has a first pair of holes 33*a* and 33*b*, and a second pair of holes 33*c* and 33*d*, located preferably aligned and below the second pair of holes 33*a* and 33*b*. Hole 33*a* is in a diagonal position with respect to hole 33*d*, and hole 33*b* is in a diagonal position with respect to hole 33*c*. Holes 33*a*, 33*b*, 33*c*, and 33*d* extend through or traverse said internal and external surfaces 28*a* and 28*b*.

The scope of the invention herein described includes any supporting base 28 having any suitable shape suitable to support on its surface a conventional utensil commonly used or related to painting surfaces or in regular maintenance activities performed on characters and objects. However, it is physically connected only to the interconnecting unit 21, as explained below.

Furthermore, supporting base 28 includes a single cylindrical protuberance 52, located near the proximal end 34*a* of its internal surface 28*a*. Said cylindrical protuberance 52 comprises a circular protuberance 52, having multiple wedges 53 arranged radially and in an alternate manner on top of said circular protuberance 52; in other words, there is a wedge-shaped indentation or recess 54 between each one of the radially distributed wedges 53. As illustrated more particularly in FIG. 7, an aperture 30 is located at the center of the circular protuberance 52; said aperture 30 extends through the interior surface 28*a* to the external surface 28*b*. Thus, it is pointed out that all four cylindrical protuberances 38, 42, 46, and 52, have the same structural features, including the same diameters. Thus, all of them may be considered as half internal gear or engagement units suitable to be coupled or engaged cooperatively.

The single cylindrical protuberance 38 on protrusion 16 of handle 14 is coupled or meshed to the first cylindrical protuberance 42 on the first oval section of the interconnecting unit 21. In such coupling, the radially arranged wedges 40 of the cylindrical protuberances 38 are positioned inside of the recesses or indentations 44 between wedges of cylindrical protuberances 42. The radially arranged wedges 43 of the cylindrical protuberances 42 are inserted in the indentations or recesses 41 of the cylindrical protuberances 38, thus forming a complete circular structure. In other words, matching or meshing the cylindrical protuberances 38 and 42 creates an internal gear or the non-permanent first coupling point 55. Once the cylindrical protuberances 38 and 42 are coupled, the apertures 18 at the center of the cylindrical protuberances 38 and aperture 25 on cylindrical protuberance 42 on the first oval section 21*a* of interconnecting unit 21 are superimposed or overlapped, forming a single and continuous channel; thus, said coupling 55 may be further secured by inserting straight screw 20 into said single-channel and further securing said straight screw 20 by inserting and tightening on its end section the butterfly wing nut 19. Socket 24 on the external surface 50*a* of the first oval section 21*a* of interconnecting unit 21 is a hexagonal socket designed or intended to receive the head of the straight screw 20.

In this manner, the coupled cylindrical protuberances 38 and 42 are firmly secured, and thus, handle 14 and interconnecting unit 21 are firmly and non-permanently coupled. A selective and predetermined position of handle 14 with respect to the first oval section 21*a* of the interconnecting unit 21 is achieved by decoupling the first coupling point and repositioning the cylindrical protuberances 38 and 42 in a selective and predetermined position. Since wedges and recess in cylindrical protuberances 38 and 42 are identical in shape and size, the coupling point may be performed by positioning any of the wedges on the cylindrical protuberance 38 with any of the recesses on cylindrical protuberance 42 in any possible combination clockwise or counterclockwise around the axis traversing of screw 20. In other words, the engagement of cylindrical protuberances 38 and 42 or the coupling point 55 may be assembled in multiple selective and predetermined combinations by rotating any of the cylindrical protuberances 38 and 42 clockwise or counterclockwise around the axis traversing straight screw 20, selecting the desired position of said cylindrical protuberances, thus assembling an internal gear. Consequently, handle 14, bearing the cylindrical protuberance 38, and interconnecting unit 21, bearing the first cylindrical protuberance 42 on the first oval section 21*a* may be coupled in multiple positions with respect to one another at the worker's will. In general, for instance, the imaginary symmetrical axis of handle 14 is positioned parallel to the imaginary symmetrical axis of the first oval section 21*a* of the interconnecting unit 21 and in perpendicular position to the symmetrical axis of the second oval section 21*b* of the interconnecting unit 21. In said particular situation, handle 14 is positioned in a parallel plane with respect to the plane of the first oval section 21*a* of the interconnecting unit 21 but in a perpendicular plane with respect to the symmetrical axis of the second oval section 21*b* of the interconnecting unit 21. In other words, handle 14, and the first oval section 21*a* are positioned in two parallel planes.

In other instances, the imaginary symmetrical axis of handle 14 is positioned nonparallel to the imaginary symmetrical axis of the first oval section 21*a* of the interconnecting unit 21. Said nonparallel position embraces multiple positions wherein handle 14 is positioned in a nonparallel plane with respect to the plane of the first oval section 21*a* of the interconnecting unit 21. In said situation, handle 14 and first oval section 21*a* are positioned in two nonparallel planes.

The exact process for coupling second cylindrical protuberance 46 on second oval section 21*b* with cylindrical protuberance 52 on supportive base 28 is performed to provide second coupling point 56. Such assembling provides the coupling of the interconnecting unit 21 with the supporting base 28 and may be made in any selective and predetermined relative position along the axis traversing the straight screw 35 and a non-permanent manner since loosening up the corresponding winged nut and removing the straight screw will undo such coupling.

For instance, accordingly, positioning second cylindrical protuberance 46 of the interconnecting unit 21 on cylindrical protuberance 52 on supporting base 53 and further inserting wedges 47 into recesses 54 and wedges 53 into recesses 48 provides the internal gear or second coupling point 56, which assembles interconnective section 21 with supporting base 28. Said second coupling is further secured by inserting straight screw 35 into aligned apertures 26 and 30 and inserting and tightening the butterfly wing nut on the end section of straight screw 35 as illustrated in, for instance, FIG. 14. More particularly, for instance, the imaginary symmetrical axis of supporting base 28 positioned parallel to the imaginary symmetrical axis of the second oval section 21*b* of the interconnecting unit 21 and in perpendicular position to the symmetrical axis of the first oval section 21*a* of the interconnecting unit 21. In said particular situation, supporting base 28 is positioned in a parallel plane with respect to the plane of the second oval section 21*b* of the interconnecting unit 21 but in a perpendicular plane with respect to the symmetrical axis of the first oval section 21*a* of the interconnecting unit 21. In other words, supporting base 28, and the second oval section 21*b* are positioned in two parallel planes.

In other instances, the imaginary symmetrical axis of supporting base 28 is positioned nonparallel to the imaginary symmetrical axis of the second oval section 21*b* of the interconnecting unit 21. Said nonparallel position embraces multiple positions wherein supporting base 28 is positioned in a nonparallel plane with respect to the plane of the second oval section 21*b* of the interconnecting unit 21. In said situation, supporting base 28 and second oval section 21*b* are positioned in two nonparallel planes.

Since the coupling of handle 14 to the first oval section 21*a* is independent of the coupling of the supporting base 28 to the second oval section 21*b*, and since the first oval section 21*a* remains perpendicular to the second oval section 21*b*, the user may assemble the tool holder in different positions wherein the handle and the supporting base are in different tridimensional positions—or what is the same, in different positions along the X, Y, and Z axis of the Cartesian system.

The spatial tridimensional effect of the perpendicularity of the first and second oval sections of the interconnection section 21 is thus better understood by the relative position of the symmetry axes of the handle 14, the supporting base 28, and the first and second oval sections 21*a* and 21*b* in a particular, selective and predetermined position. As explained above, the symmetrical axis of handle 14 is suitable to be positioned parallel with respect to the symmetrical axis of the first oval section 21*a* without changing the relative position of the supporting base 28. Alternatively, handle 14 is also suitable to be assembled to the first oval section in multiple positions wherein the symmetry axis of the handle is in a nonparallel position with respect to the symmetry axis of the first oval section without changing the relative position of the supporting base 28. Similarly, the symmetry axis of the supporting base 28 is suitable for positioning parallel to the symmetry axis of the second oval section without changing the relative position of the handle 14. Alternatively, the supporting base is suitable for assembly to the second oval section in multiple positions wherein the symmetry axis of the supporting base 28 is in a nonparallel position with respect to the symmetry axis of the second oval section without affecting the relative position of the handle. Alternatively, said selective and relative predetermined positions of the handle 14 and the supporting base 28 on the interconnecting unit 21 are the result of the perpendicularity of the first oval section with respect to the second oval section, and it may also be understood using the cartesian systems.

Figure 10:
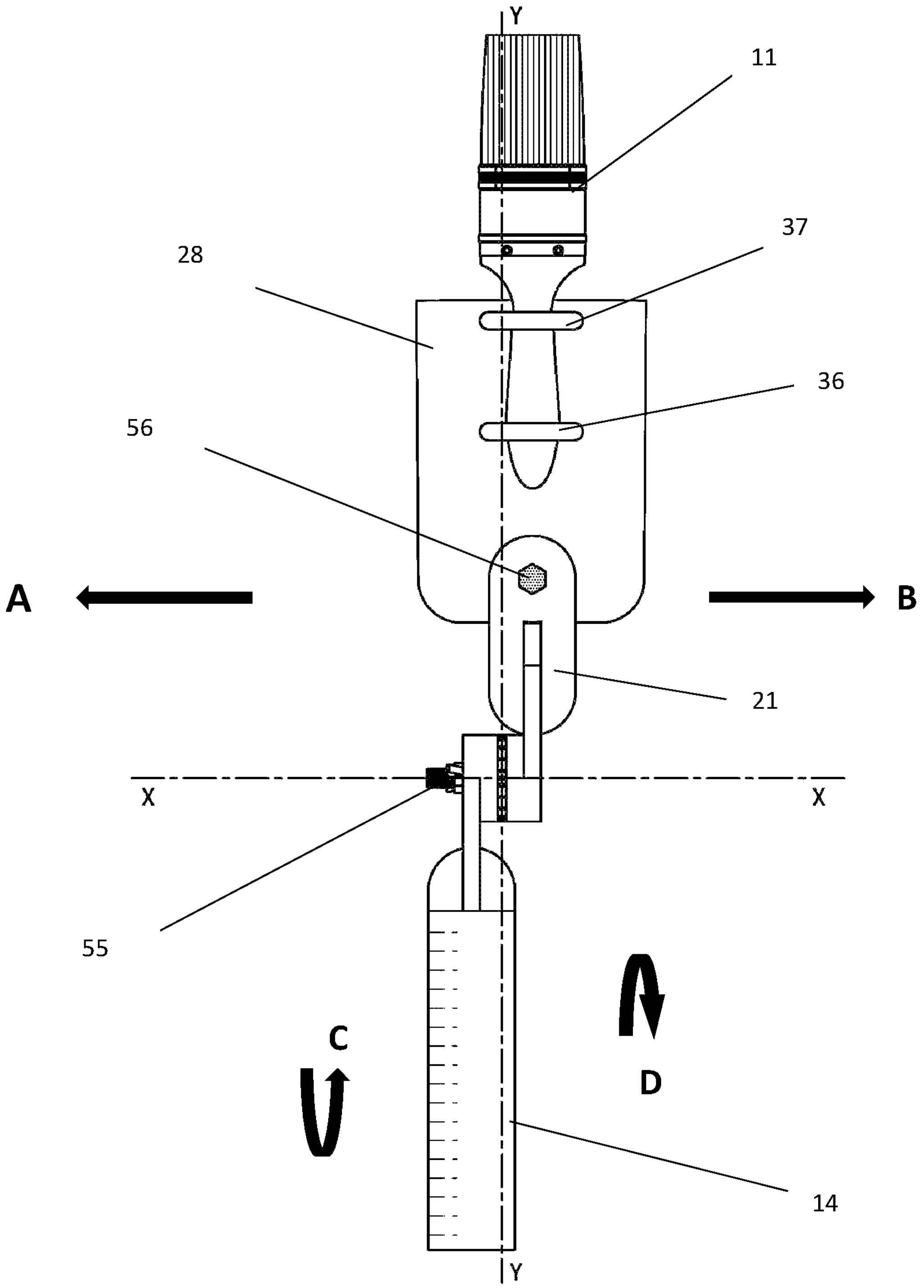
FIG. 10 shows a top view of an embodiment of the tool holder according to the invention on a cartesian X, Y-axis system, which is centralized on the first coupling point of the tool holder, wherein the handle is coupled to the first oval section of the interconnecting unit invention and wherein the symmetry axis of the handle is parallel to the symmetry axis of the first oval section, and the symmetry axis of the supporting base is parallel to the symmetry axis of the second oval section.

For example, FIG. 10 shows a top view of an embodiment of the tool holder according to the invention of a cartesian XY-axes system, which is centralized on the first coupling point of the tool holder. It also shows a spatial position wherein the symmetrical axis of the handle is parallel to the symmetrical axis of the first oval section, and the symmetrical axis of the supporting base is parallel to the symmetrical axis of the second oval section.

Figure 11:
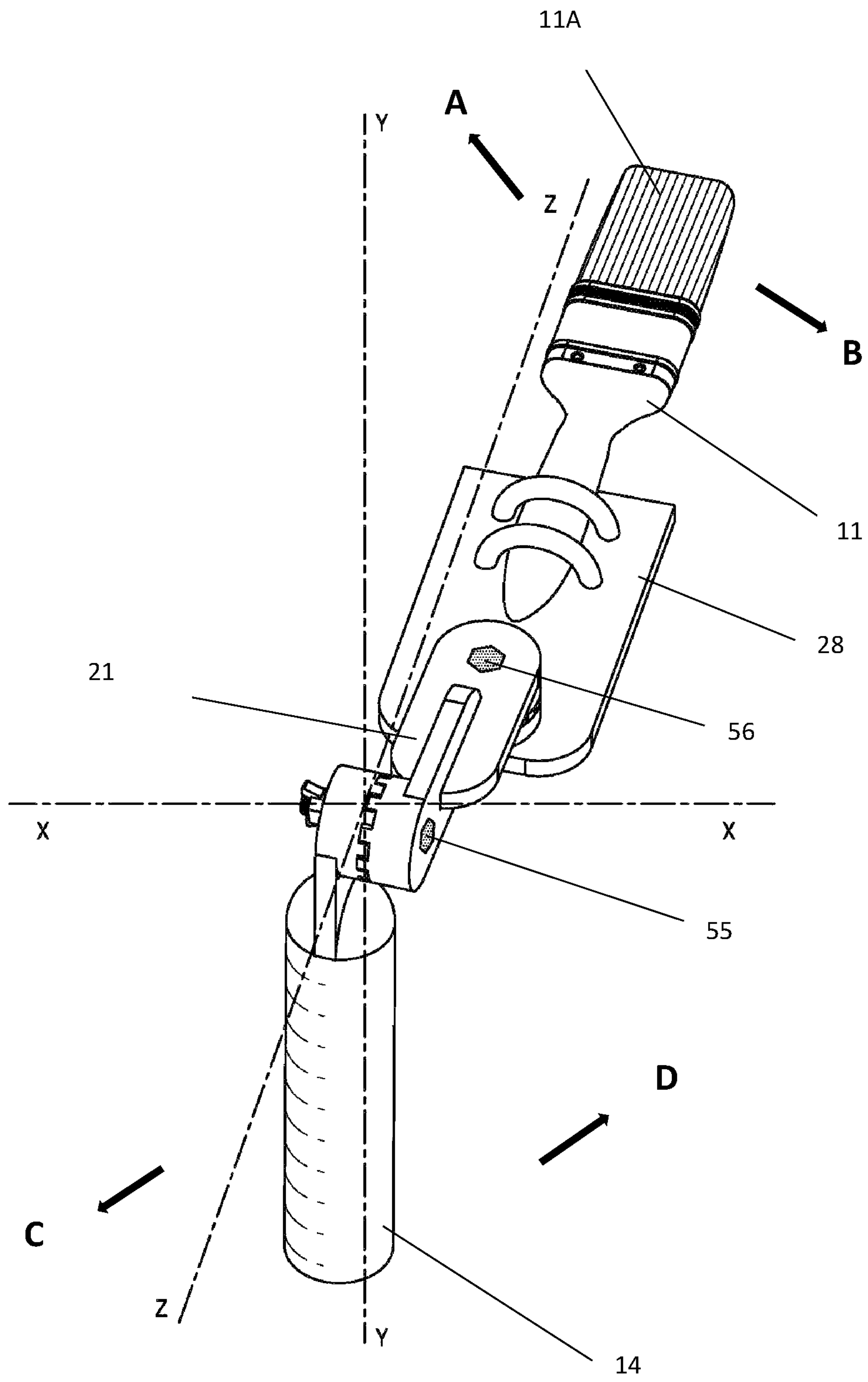
FIG. 11 shows a top perspective view of the tool holder embodiment of according to the invention having a cartesian X, Y, and Z-axis system, centralized on the coupling point of the handle and the interconnecting unit and further holding a conventional paint brush, as an example of the utensil that may be clamped, fastened or secured on the supporting base, wherein the supporting base has been positioned along the Z-Z axis, and wherein the symmetry axis of the handle is not parallel to the symmetry axis of the first oval section and the symmetry axis of the supporting base is parallel to the symmetry axis of the second oval section.

Similarly, FIG. 11 shows a top perspective view of the tool holder embodiment according to the invention having a cartesian X, Y, and Z-axis system, centralized on the coupling point of the handle and the interconnecting unit and further holding a conventional paintbrush, as an example of the utensil that may be clamped, fastened or secured on the supporting base, wherein the supporting base has been positioned along the Z-Z axis, and wherein the symmetry axis of the handle is not parallel to the symmetry axis of the first oval section, however, the symmetry axis of the supporting base is parallel to the symmetry axis of the second oval section.

Figure 12:
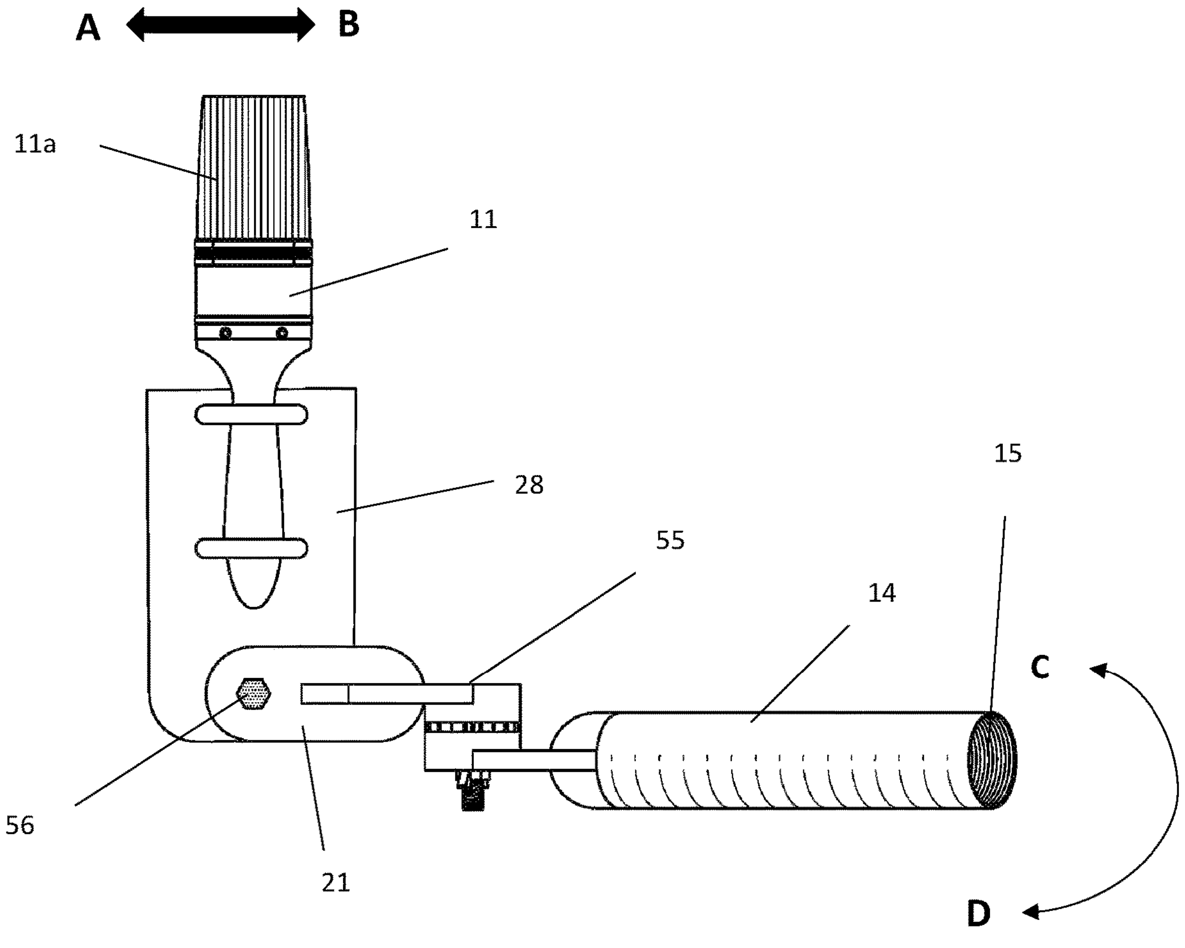
FIG. 12 is a perspective view showing the tool holder holding a conventional paint brush, as an example of the utensil that may be clamped, fastened, or secured on the supporting base; wherein the central axis of the handle is angled with respect to the first coupling point and the central axis of the supporting base is positioned perpendicular to the second coupling point, thus positioning the handle and the supporting base in a tridimensional angled position; in other words, wherein the symmetry axis of the handle is not parallel to the symmetry axis of the first oval section and the symmetry axis of the supporting base is not parallel to the symmetry axis of the second oval section.

In FIG. 12 a perspective view showing the tool holder holding a conventional paintbrush, as an example of the utensil that may be clamped, fastened, or secured on the supporting base; wherein the central axis of the handle is angled with respect to the first coupling point and the central axis of the supporting base is positioned perpendicular to the second coupling point, thus positioning the handle and the supporting base in a tridimensional angled position; in other words, wherein the symmetry axis of the handle is not parallel to the symmetry axis of the first oval section and the symmetry axis of the supporting base is neither parallel to the symmetry axis of the second oval section.

Figure 13:
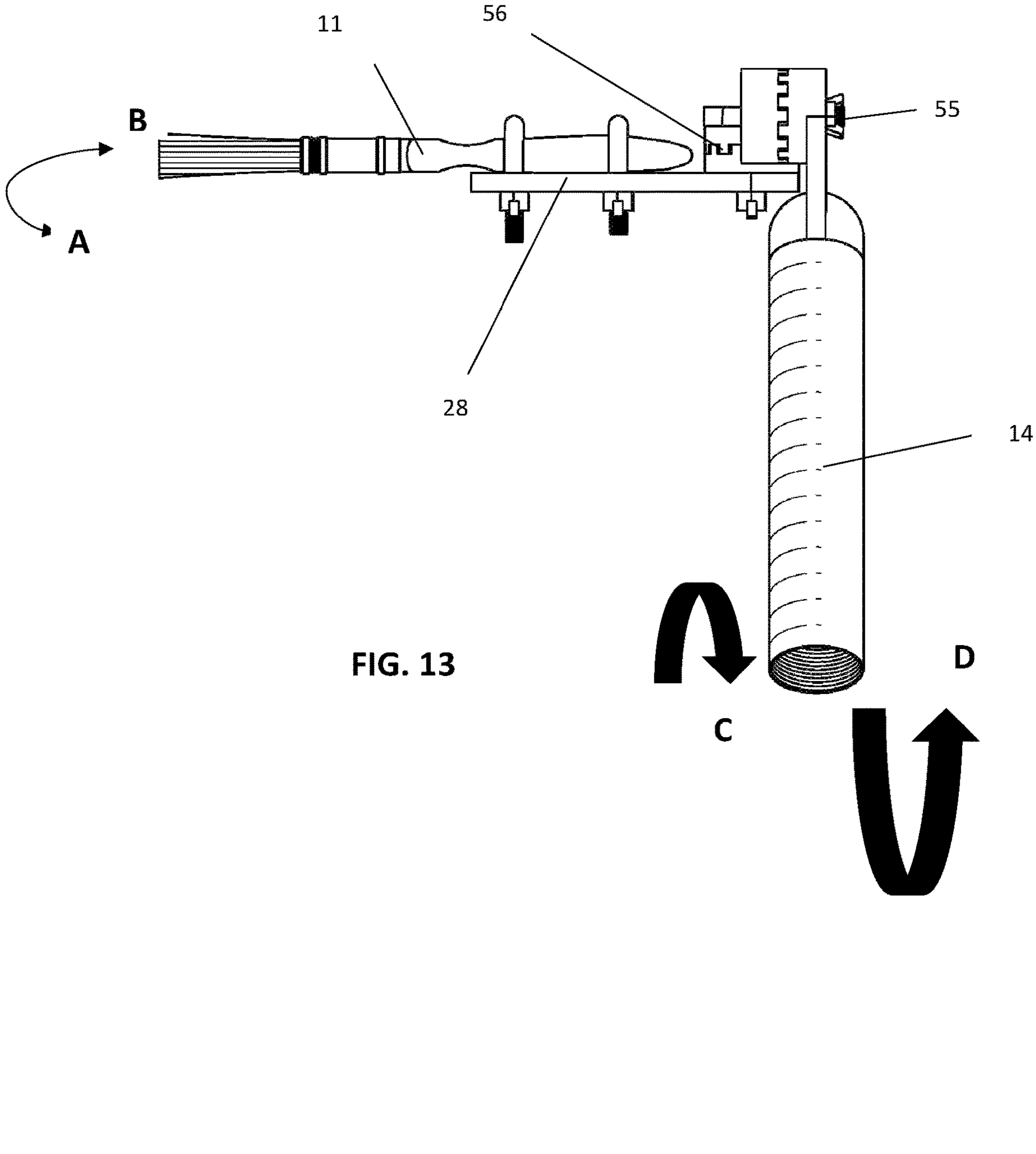
FIG. 13 is a perspective view showing the tool holder holding a conventional paint brush clamped on the supporting base; wherein the central axis of the handle is angled with respect to the first coupling point and the central axis of the supporting base is positioned behind the handle, thus positioning the handle in front of the supporting base in a tridimensional angled position; in other words, wherein the symmetry axis of the handle is not parallel to the symmetry axis of the first oval section and the symmetry axis of the supporting base is parallel to the symmetry axis of the second oval section.

FIG. 13 is a perspective view showing the tool holder holding a conventional paint brush clamped on the supporting base; wherein the central axis of the handle is angled with respect to the first coupling point and the central axis of the supporting base is positioned behind the handle, thus positioning the handle in front of the supporting base in a tridimensional angled position; in other words, wherein the symmetry axis of the handle is not parallel to the symmetry axis of the first oval section and the symmetry axis of the supporting base is parallel to the symmetry axis of the second oval section.

FIGS. 1, 12, 13, and 15 all show embodiments of the tool holder 10 assembled in different positions, wherein the spatial relationship of the handle 14 and the supporting base 28 is different. Furthermore, FIGS. 1, 12, 13, and 15 also suggest even more potential positions in which the tool holder 10 may be assembled. Thus, tool holder 10 presents a high versatility for how a worker may assemble it, which may be adapted to a particular worker's particular ergonomic position and conditions.

Once tool holder 10 is assembled in a predetermined manner at the convenience of the worker, a given functional or useful article or utensil, conventionally used in a given or predetermined work or human activity may be positioned and clamped to the internal surface 28*a* of the supporting section 28 using, for example, U-shaped screws 36 and 37 and butterfly wings nuts 32*a*-32*d*. As examples of the multiple utensils suitable to be held in the tool holder 10 and without excluding others; in FIGS. 1, 11, 12, 13, and 14, paint brush 11 is used as an example of one painting utensil that may be clamped to supporting base 28; in FIG. 15, a paint roller 60 is illustrated clamped to the tool holder 10 while in FIG. 16, holder tool 10 is illustrated with a dusting brush 62 clamped or fastened. The substitution of U-shaped screws 36 and 37 by other suitable fastening means, such as stripes, wires, adhesive bands, belts, Velcro® straps, and the like in order to fasten the tool or utensil on supporting base 28 are within the scope of the instant invention. Such alternative fastening means may or may not require the use of apertures 33*a*-33*d* on supporting unit 28.

More particularly, in FIG. 10, the embodiment tool holder 10, already assembled and having paintbrush 11 clamped on supportive base 28, is shown having the central axis of the first coupling 55 on the interception of the X and Y-axis of a cartesian perpendicular axis system; wherein the handle 14 and the supporting base 28 are parallel to each other and also parallel to the Y-Y axis. In such a position, the bristles of paint brush 11 are aligned in reference to handle 14.

The worker, however, has the alternative to easily reposition said bristles in multiple angled positions to the left or the right sides with reference to the handle 14 by simply keeping the first coupling point 55 in the same position as illustrated in FIG. 10, and re-assembling the cylindrical protuberances 46 and 52—or the second coupling point 56—to a new position; it may, for instance, coupling the supporting base 28 and the interconnecting unit 21 in any position toward the left side in the direction of arrow and letter A; alternatively, it may reassemble it at any position toward the right side in the direction of the arrow and letter B. In other words, the worker may position the supporting base 28 in any direction along the X-X and Y-Y axes while keeping the handle 14 in the same original position on the Y-Y axis. As mentioned previously, such re-assembling is done by losing winged nut 31, moving the cylindrical protuberance 52 to the left or the right of the second cylindrical protuberance on the second oval section of the interconnecting unit, recoupling said cylindrical protuberances 46 and 52 again, and tightening winged nut 31 to straight screw 20 again. In this manner, supporting base 28 may be positioned in any predetermined position along the Y-Y axis.

On the other hand, by doing the opposite: keeping the second coupling point 56, in other words, keeping the supporting base 28 and the interconnecting unit 21 coupled as illustrated in FIG. 10, and further recoupling the first coupling point 55, in other words, re-assembling the cylindrical protuberance 38 on the handle and the first protuberance 42 on the first oval section of the interconnecting unit, the handle 14 may be positioned in multiple angled positions along the Y-Y axis, such positions may be assembled upwardly to the Y-Y axis as suggested by the arrows and letter C or downwardly as suggested by the arrow pointing to the letter D. Thus, providing the worker the option of positioning the bristles of the paint brush in multiple angled positions upwardly or downwardly in reference to the handle 14.

Furthermore, supporting base 28 may be positioned in even more multiple-angled positions by, for instance, recoupling and setting coupling point 55 and further maintaining the given position of coupling point 56, or vice versa. In this manner, for instance, the supporting base 28 may be positioned at any of the multiple-angled positions along the X-X axis or Y-Y axis.

Even further, as illustrated in FIG. 11, tool holder 10 may also be assembled having the supporting base 28 positioned in any position along the Z-Z axis. The re-assembling tool holder 10 by maintaining the original position of the handle-interconnecting unit or first coupling point 55 as illustrated in FIG. 11 and recoupling the engagement of the interconnecting unit-supportive base or second coupling point 56, also allows the worker to position the supporting base 28 in any position along the Z-Z axis, as indicated in directions identified by letters A and B in FIG. 11. The opposite action would position the handle 14 in any angled position along the Y-Y axis, as indicated by the letters C and D in FIG. 11.

FIG. 12 shows a perspective view of the tool holder 10 assembled with the handle 14 angled to the coupling 55 and the supporting base 28 perpendicular to the coupling 56. Thus, the bristles of the paintbrush are angled with respect to the handle 14. Supporting base 28 may be reassembled in the letters A or B direction, while handle 14 may be reassembled in the letters Cor D directions, as illustrated in FIG. 12.

Similarly, FIG. 13 is a perspective view of the tool holder 10 assembled in a manner in which coupling points 55 and 56 are aligned while the supporting base 28 is behind the handle 14, which is in an angled position with respect to coupling point 55. The same position is shown in the perspective view illustrated in FIG. 14, wherein a paint roller 60 is illustrated in place of a paintbrush 11. Similarly, in perspective, the view illustrated in FIG. 15, tool holder 10 is illustrated showing the supportive base 28 angled with respect to the handle 14 and holding a dusting brush 62.

Figure 14:
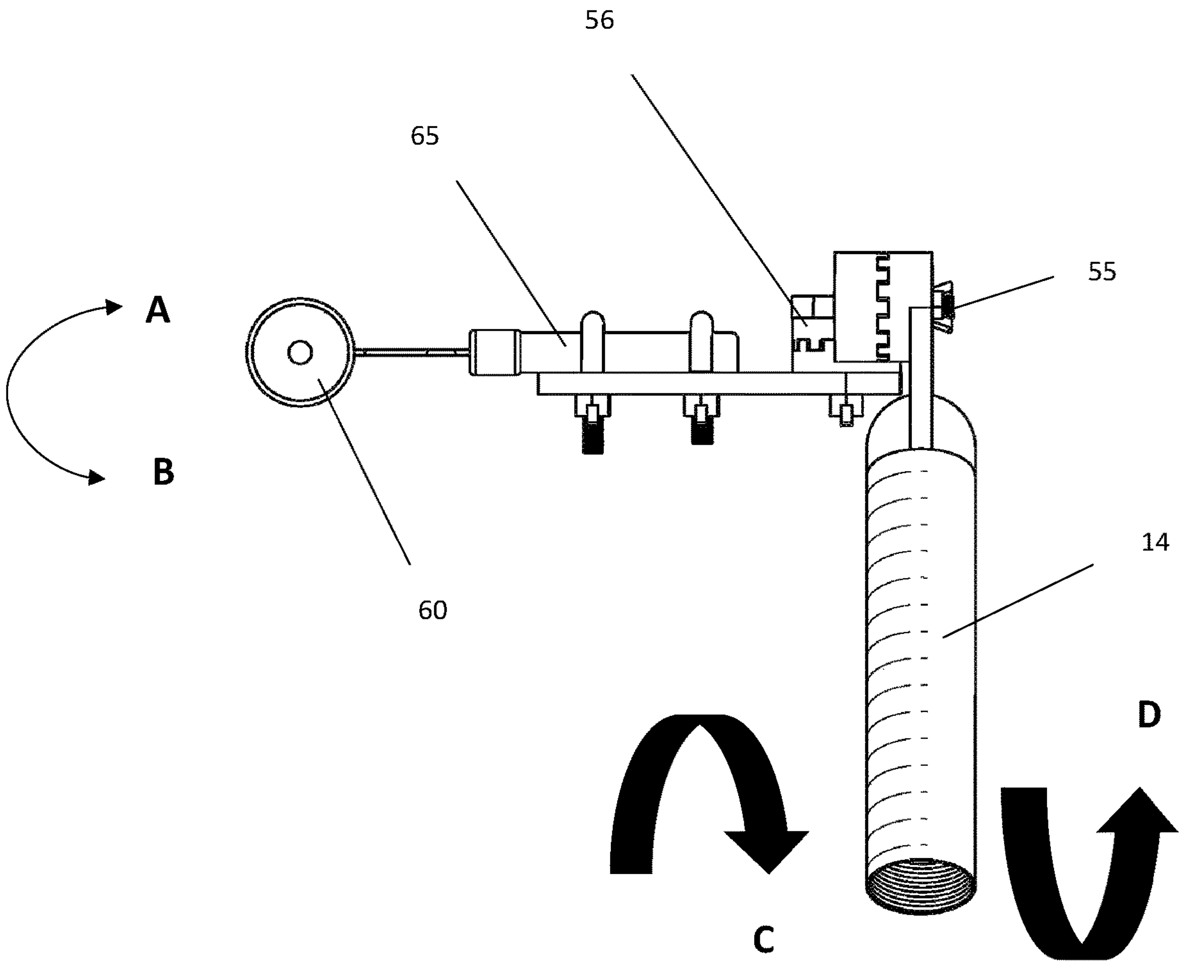
FIG. 14 is a perspective view showing the tool holder, holding a conventional paint roller clamped on the supporting base, as an example of a given utensil that may be clamped, fastened, or secured on the supporting base; the position of the tool holder is the same as already illustrated in FIG. 13.
Figure 15:
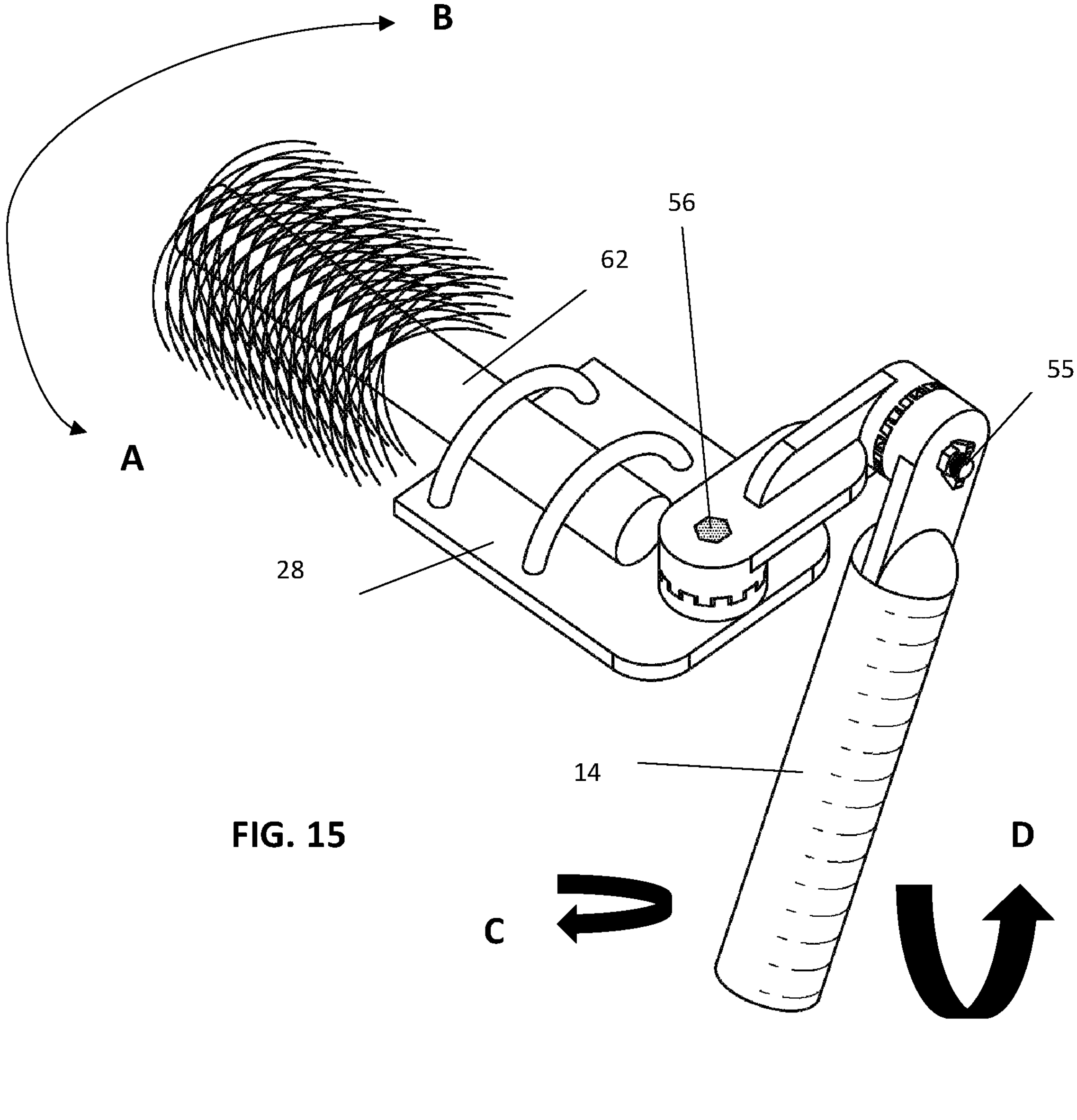
FIG. 15 is a perspective top view showing the tool holder, according to the invention, holding a conventional dust remover, as an example of a given utensil that may be clamped, fastened, or secured on the supporting base, wherein the dusted remover is positioned aligned to the second coupling point and parallel to the first coupling point; thus, the supporting base is in a Z-Z axis with respect to the first coupling. In other words, wherein the symmetry axis of the handle is not parallel to the symmetry axis of the first oval section and the symmetry axis of the supporting base is neither parallel to the symmetry axis of the second oval section.

In FIGS. 13, 14, and 15, the movement indicated by arrows A and B, suggests the movement or direction of the supporting base along the Z-Z axis. In contrast, the letters in arrows C and D, suggest the movement or direction of handle 14 in any position along the Y-Y axis. In this manner, utensils conventionally used for painting or in paint preparation, such as paint scrapers, paint brushes, paint rollers, and the like, may be securely and firmly held and or clamped to the supporting base 28 of the tool holder 10 in any suitable or convenient straight or angled position that results ergonomically to the painter and, maybe further be used in said painting related activities on areas and objects challenging to reach, once the tool holder 10 is adapted to a conventional extension pole. Thus, the herein-disclosed tool holder offers an excellent alternative to clean and paint surfaces out of the reach of the painter in an ergonomic position and without the need for ladders, cradles, scaffolds, and the like.

Similarly, since utensils commonly used in maintenance activities of objects, walls, and ceilings-such as brooms, brushes, feather dusters, and the like—may also be firmly and securely clamped and held to the tool holder 10, it is also highly convenient in the regular maintenance activities of objects installed in high or difficult to reach areas and/or in angled positions; likewise, it may be used in maintenance activities, such as removal of dust and cobwebs on high ceilings, high walls, and similar areas, cleaning of fans, air conditioning, lamps and chandeliers installed in high places or in areas difficult to reach.

Finally, while the present invention has been described in terms of particular embodiments and applications, in both summarized and detailed forms, it will be understood that many substitutions, changes, and variations in the described embodiments, applications, and details of the novel tool illustrated herein and of its operation can be made by those skilled in the art to adapt it to various usages and conditions, without departing from the spirit of this invention. As such, these changes and modifications are properly, equitably, and intended to be within the full range of equivalence of the following. While the invention has been described in conjunction with some embodiments, it is to be understood that many alternatives, modifications, and variations will be apparent to those skilled in the art considering the preceding description. Accordingly, the invention is intended to embrace all such alternatives, modifications, and variations falling within the spirit and scope of the appended claims.

What is claim is:

1. A tool holder for holding a conventional tool, said tool holder comprising:

(a) a handle comprising:

i) an elongated, integral, cylindrical body comprising a proximal end and a rounded distal end with no exit to the exterior of the handle;

ii) a threaded borehole located at the proximal end of said elongated, integral, cylindrical body;

iii) a protrusion projecting from the center of the rounded distal end of the elongated, integral, cylindrical body, said protrusion comprising a flat and smooth external surface, a flat internal surface, and a rounded end;

iv) a single cylindrical protuberance emerging from the flat internal surface of said protrusion, said cylindrical protuberance comprising multiple wedges arranged radially and alternately with wedge-shaped recesses on top of said cylindrical protuberance, and an aperture at the center that extends through the flat internal surface to the flat exterior surface of said protrusion;

(b) an interconnecting unit comprising:

i) a main body comprising a first oval section having a flat external surface and a flat internal surface, a second oval section having a flat external surface and a flat internal surface, wherein said second oval section is formed perpendicularly to the first oval section, and wherein said first oval section and said second oval sections provide the complete physical configuration of said main body;

ii) a first cylindrical protuberance emerging from the flat internal surface of said first oval section, said first cylindrical protuberance comprising multiple wedges arranged radially and alternately with wedge-shaped recesses on top of said first cylindrical protuberance, and an aperture at the center that extends through the flat internal surface to the flat exterior surface of said first oval section; said first cylindrical protuberance coupled selectively and in a predetermined position to the single cylindrical protuberance on the flat internal surface of the protrusion of the handle, said coupling providing the coupling of the handle to the first oval section of the interconnecting unit;

iii) a second cylindrical protuberance emerging from the flat internal surface of said second oval section and in perpendicular position to the first cylindrical protuberance on the flat internal surface of the first oval section, said second cylindrical protuberance comprising multiple wedges arranged radially and alternately with wedge-shaped recesses on top of said first cylindrical protuberance, and an aperture at the center that extends through the flat internal surface to the flat exterior surface of said second oval section;

(c) a first straight screw traversing the aperture at the center of the first cylindrical protuberance on the first oval section of the interconnecting unit and the aperture at the center of the single cylindrical protuberance on the flat internal surface of the protrusion of the handle;

(d) a first butterfly wing nut threaded to the end of said first screw and securing the coupling of the first cylindrical protuberance on the flat internal surface first of the first oval section of the interconnecting unit with the single cylindrical protuberance on the flat internal surface of the protrusion of the handle;

(e) a supporting base comprising:

(i) a flat main body comprising a flat internal surface, a flat smooth external surface, a proximal end, and a distal end;

(ii) at least two holes near the distal end of said flat main body passing through the internal flat surface to the flat external surface of said flat main body;

(iii) at least two holes placed below the holes in the near distal end of said flat main body and passing through the internal flat surface to an external flat surface of said flat main body;

(vi) a single cylindrical protuberance emerging from the flat internal surface and near the proximal end of the flat main body, said cylindrical protuberance comprising multiple wedges arranged radially and alternately with wedge-shaped recesses on top of said cylindrical protuberance and having an aperture at the center that extends through the flat internal surface to the flat exterior surface of said flat main body, said cylindrical protuberance coupled selectively and in a predetermined position to the second cylindrical protuberance on the flat internal surface of the second oval section of the interconnecting unit, thus providing the coupling of the supporting base with the second oval section of the interconnecting unit, and wherein said coupling is in a perpendicular position to the coupling of the single cylindrical protuberance on the flat internal surface of the protrusion of the handle with the first cylindrical protuberance on the flat internal surface of the first oval section of the interconnecting unit;

(f) a second straight screw inserted through the aperture at the center of the second cylindrical protuberance on the flat internal surface of the second oval section of the interconnecting unit and the aperture at the center of the single cylindrical protuberance on the flat internal surface of the flat main body of the supporting base;

(g) a second butterfly wing nut threaded to the end of said second straight screw and securing the coupling of the second cylindrical protuberance on the flat internal surface of the second oval section of the interconnecting unit with the single cylindrical protuberance on the flat internal surface of the flat main body of the supporting base;

(h) means for fastening a tool on the main flat body of the supporting base.

2. The tool holder as recited in claim 1, wherein the handle and the first oval section of the interconnecting unit are assembled or coupled in parallel planes.

3. The tool holder as recited in claim 2, wherein the supporting base and the second oval section of the interconnecting unit are assembled or coupled in parallel planes.

4. The tool holder as recited in claim 2, wherein the supporting base and the second oval section of the interconnecting unit are assembled or coupled in nonparallel planes.

5. The tool holder as recited in claim 1, further comprising a socket at the top of the aperture on the external surface of the first oval surface and a socket on the top of the aperture of the external surface of the second oval section of the interconnecting unit.

6. The tool holder as recited in claim 5, wherein the head of the first straight screw is inserted into the socket on top of the aperture of the external surface of the first oval section of the interconnecting unit and the head of the second straight screw is inserted into the socket on top of the aperture of the external surface of the second oval section of the interconnecting unit.

7. The tool holder as recited in claim 1, wherein the main body of the supporting base has a curved proximal end and a straight distal end.

8. The tool holder as recited in claim 1, wherein the means for fastening a tool on the supporting base are selected from stripes, wires, adhesive bands, belts, Velcro® straps, U-shaped screws in combination with butterfly wing nuts or combinations thereof.

9. The tool holder as recited in claim 8, wherein the means for fastening comprises at least one U-shaped screw traversing holes on the supportive base in cooperation with two butterfly wing nuts threaded into each one of the ends of said U-shaped screw.

10. The tool holder as recited in claim 8, wherein the means for fastening comprises at least two U-shaped screws traversing holes on the supporting base in cooperation with two pairs of butterfly wing nuts threaded into each one of the ends of each one of said U-shaped screws.

11. The tool holder as recited in in claim 1, wherein the handle, the interconnecting unit, and the supporting base are made of a resilient, strong, rigid, and hard material selected from metal, plastic, PVC, or combinations thereof.

12. The tool holder as recited in claim 1, wherein the handle and the first oval section of the interconnecting unit are assembled or coupled in nonparallel planes.

13. The tool holder as recited in claim 12, wherein the supporting base and the second oval section of the interconnecting unit are assembled or coupled in parallel planes.

14. The tool holder as recited in claim 12, wherein the supporting base and the second oval section of the interconnecting unit are assembled or coupled in nonparallel planes.

15. The tool holder as recited in claim 1, wherein the tool held on said tool holder is selected from a painting or maintenance tool.

16. A tool holder comprising:

(a) handle comprising:

(i) an elongated, integral, cylindrical body comprising a proximal end and a rounded distal end with no exit to the exterior of the handle;

(ii) a threaded borehole located at the proximal end of said elongated, integral, cylindrical body;

(iii) a protrusion projecting from the center of the rounded distal end of the elongated, integral, cylindrical body, said protrusion comprising a flat, smooth external surface; a flat internal surface, and a rounded end;

(iv) a single cylindrical protuberance emerging from the flat internal surface of said protrusion, said cylindrical protuberance comprising multiple wedges arranged radially and alternately with wedge-shaped recesses on top of said cylindrical protuberance, and an aperture at the center that extends through the flat internal surface to the flat exterior surface of said protrusion;

(b) an interconnecting unit comprising:

i) a main body comprising a first oval section having a flat external surface and a flat internal surface, a second oval section having a flat external surface and a flat internal surface wherein said second oval section is formed perpendicularly to the first oval section, and wherein said first oval section and said second oval sections provide the complete physical configuration of said main body;

ii) a first cylindrical protuberance emerging from the flat internal surface of said first oval section, said first cylindrical protuberance comprising multiple wedges arranged radially and alternately with wedge-shaped recesses on top of said first cylindrical protuberance, and an aperture at the center that extends through the flat internal surface to the flat exterior surface of said first oval section; said first cylindrical protuberance coupled selectively and in a predetermined position to the single cylindrical protuberance on the flat internal surface of the protrusion of the handle, said coupling providing the coupling of the handle to the first oval section of the interconnecting unit;

iii) a second cylindrical protuberance emerging from the flat internal surface of said second oval section and in perpendicular position to the first cylindrical protuberance on the flat internal surface of the first oval section, said second cylindrical protuberance comprising multiple wedges arranged radially and alternately with wedge-shaped recesses on top of said first cylindrical protuberance, and an aperture at the center that extends through the flat internal surface to the flat exterior surface of said second oval section;

(c) a first straight screw traversing the aperture at the center of the first cylindrical protuberance on the first oval section of the interconnecting unit and the aperture at the center of the single protuberance on the flat internal surface of the single cylindrical protrusion of the handle;

(d) a first butterfly wing nut threaded to the end of said first screw and securing the coupling of the first cylindrical protuberance on the flat internal surface first of the first oval section of the interconnecting unit with the single cylindrical protuberance on the flat internal surface of the protrusion of the handle;

(e) a supporting base comprising:

(i) a flat main body comprising a flat internal surface, a flat external surface, a proximal end, and a distal end;

(ii) at least two holes near the distal end of said flat main body passing through the internal flat surface to the flat external surface of said flat main body;

(iii) at least two holes placed below the holes in the near distal end of said flat main body and passing through the internal flat surface to an external flat surface of said flat main body;

(vi) a single cylindrical protuberance emerging from the flat internal surface of the flat main body, said cylindrical protuberance comprising multiple wedges arranged radially and alternately with wedge-shaped recesses on top of said cylindrical protuberance and having an aperture at the center that extends through the flat internal surface to the flat exterior surface of said flat main body, said single cylindrical protuberance coupled selectively and in a predetermined position to the second cylindrical protuberance on the flat internal surface of the second oval section of the interconnecting unit, thus providing the coupling of the supporting base with the second oval section of the interconnecting unit, and wherein said coupling is in a perpendicular position to the coupling of the single cylindrical protuberance on the flat internal surface of the protrusion of the handle with the first cylindrical protuberance on the flat internal surface of the first oval section of the interconnecting unit;

(f) a second straight screw traversing the aperture at the center of the second cylindrical protuberance on the flat internal surface of the second oval section of the interconnecting unit and the aperture at the center of the single cylindrical protuberance on the flat internal surface of the flat main body of the supporting base;

(g) a second butterfly wing nut threaded to the end of said second straight screw and securing the coupling of the second cylindrical protuberance on the flat internal surface of the second oval section of the interconnecting unit with the single cylindrical protuberance on the flat internal surface of the flat main body of the supporting base;

h) a first U-shaped screw end inserted through holes on the flat main body of the supporting base;

i) a third butterfly wing nut threaded into the first of the ends of the first U-shaped screw;

j) a third butterfly wing nut threaded into the second end o of the first U-shaped screw;

k) a second U-shaped screw inserted through two holes on the flat main body of the supporting base;

l) A fifth butterfly wing nut threaded into the first of the ends of the second U-shaped screw;

m) a sixth butterfly wing nut threaded into the second end o of the second U-shaped screw.

* * * * *